United States Patent
Hey et al.

(10) Patent No.: US 10,011,326 B2
(45) Date of Patent: *Jul. 3, 2018

(54) WATERCRAFT LIFT AND AUTOMATIC WATERCRAFT COVER

(71) Applicant: Sunstream Corporation, Kent, WA (US)

(72) Inventors: Kenneth Edwards Hey, Mercer Island, WA (US); Dean Allen Stanford, Seattle, WA (US); Loern Halverson, Bellevue, WA (US)

(73) Assignee: Sunstream Corporation, Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,658

(22) Filed: Dec. 5, 2016

(65) Prior Publication Data

US 2017/0152007 A1    Jun. 1, 2017

Related U.S. Application Data

(63) Continuation of application No. 14/708,054, filed on May 8, 2015, now Pat. No. 9,527,552.
(Continued)

(51) Int. Cl.
   *B63B 17/02* (2006.01)
   *B63C 3/06* (2006.01)
   (Continued)

(52) U.S. Cl.
   CPC ............... *B63B 17/02* (2013.01); *B60J 7/085* (2013.01); *B63C 3/06* (2013.01); *B63C 3/12* (2013.01);
   (Continued)

(58) Field of Classification Search
   CPC .. B63C 3/06; B63B 17/02; E04H 6/04; E04H 6/06
   See application file for complete search history.

(56) References Cited

U.S. PATENT DOCUMENTS 3,139,732 A    7/1964   Thompson
3,549,198 A   12/1970   Cappello
(Continued)

FOREIGN PATENT DOCUMENTS

FR   2885152 A1    3/2006
WO   9801314       1/1998
WO   2013044162 A1 3/2013

*Primary Examiner* — Frederick L Lagman
(74) *Attorney, Agent, or Firm* — George C. Rondeau, Jr.; Davis Wright Tremaine LLP

(57) ABSTRACT

A boat lift with hydraulically or mechanically actuated arms which self-installs a fitted three-dimensional boat cover on a powerboat. The control logic of the system allows for cover operation only when the lift is raised. A spring-tensioned roller keeps the cover tight and self-rolls the cover on the roller when the actuated arms are pivoted forward. The roller is hidden behind the boat in 'cover-on' position. A slip clutch prevents the torsion spring from being over tightened. The forward position of the roller is adjusted by adjusting the hydraulic cylinder length. The rearward position of the roller is adjusted by limiting the retracted position of the hydraulic cylinder. A non-hydraulic embodiment actuates the cover when the lift is operated.

36 Claims, 20 Drawing Sheets

Related U.S. Application Data

(60) Provisional application No. 61/991,214, filed on May 9, 2014.

(51) Int. Cl.
*E04F 10/02* (2006.01)
*B63C 3/12* (2006.01)
*B60J 7/08* (2006.01)
*E04F 10/06* (2006.01)

(52) U.S. Cl.
CPC .......... *E04F 10/02* (2013.01); *E04F 10/0651* (2013.01); *E04F 10/0659* (2013.01)

(56) References Cited

U.S. PATENT DOCUMENTS

| | | | |
|---|---|---|---|
| 4,019,212 A | 4/1977 | Downer | |
| 4,095,840 A | 6/1978 | Woodard | |
| 4,683,900 A * | 8/1987 | Carmichael | B63B 17/02 114/361 |
| 4,699,044 A | 10/1987 | Riggs | |
| 4,895,479 A | 1/1990 | Michaelsen et al. | |
| 5,240,303 A * | 8/1993 | Hageman | B60J 7/062 296/100.12 |
| 5,292,169 A | 3/1994 | O'Brian | |
| 5,660,137 A * | 8/1997 | Manley | B63B 17/02 114/361 |
| 5,908,264 A | 6/1999 | Hey | |
| 6,199,935 B1 | 3/2001 | Waltz | |
| 6,688,252 B1 | 2/2004 | Caravella | |
| 6,837,651 B1 | 1/2005 | Basta | |
| 6,846,129 B1 | 1/2005 | Edson | |
| 7,001,104 B2 | 2/2006 | Edson | |
| 8,056,497 B1 | 11/2011 | Rondeau | |
| 8,162,377 B2 | 4/2012 | Miller et al. | |
| 8,544,922 B1 * | 10/2013 | Huzar | B65D 85/52 294/157 |
| 8,911,174 B2 * | 12/2014 | Hey | B63C 3/06 114/361 |
| 9,527,552 B2 * | 12/2016 | Hey | B63B 17/02 |
| 2002/0157696 A1 | 10/2002 | O'Brien | |
| 2005/0016438 A1 | 1/2005 | Hey | |
| 2005/0123351 A1 | 6/2005 | Basta | |
| 2005/0139141 A1 | 6/2005 | Hey et al. | |
| 2005/0212322 A1 * | 9/2005 | Porter | B60J 11/02 296/98 |
| 2006/0232095 A1 * | 10/2006 | Sedighzadeh | B60J 11/02 296/98 |
| 2008/0141926 A1 | 6/2008 | Tufte | |
| 2013/0017055 A1 * | 1/2013 | Vieira | B25G 1/02 414/800 |
| 2013/0195383 A1 * | 8/2013 | Daugs, Jr. | B65D 51/00 383/12 |
| 2013/0266377 A1 | 10/2013 | Hey et al. | |

* cited by examiner

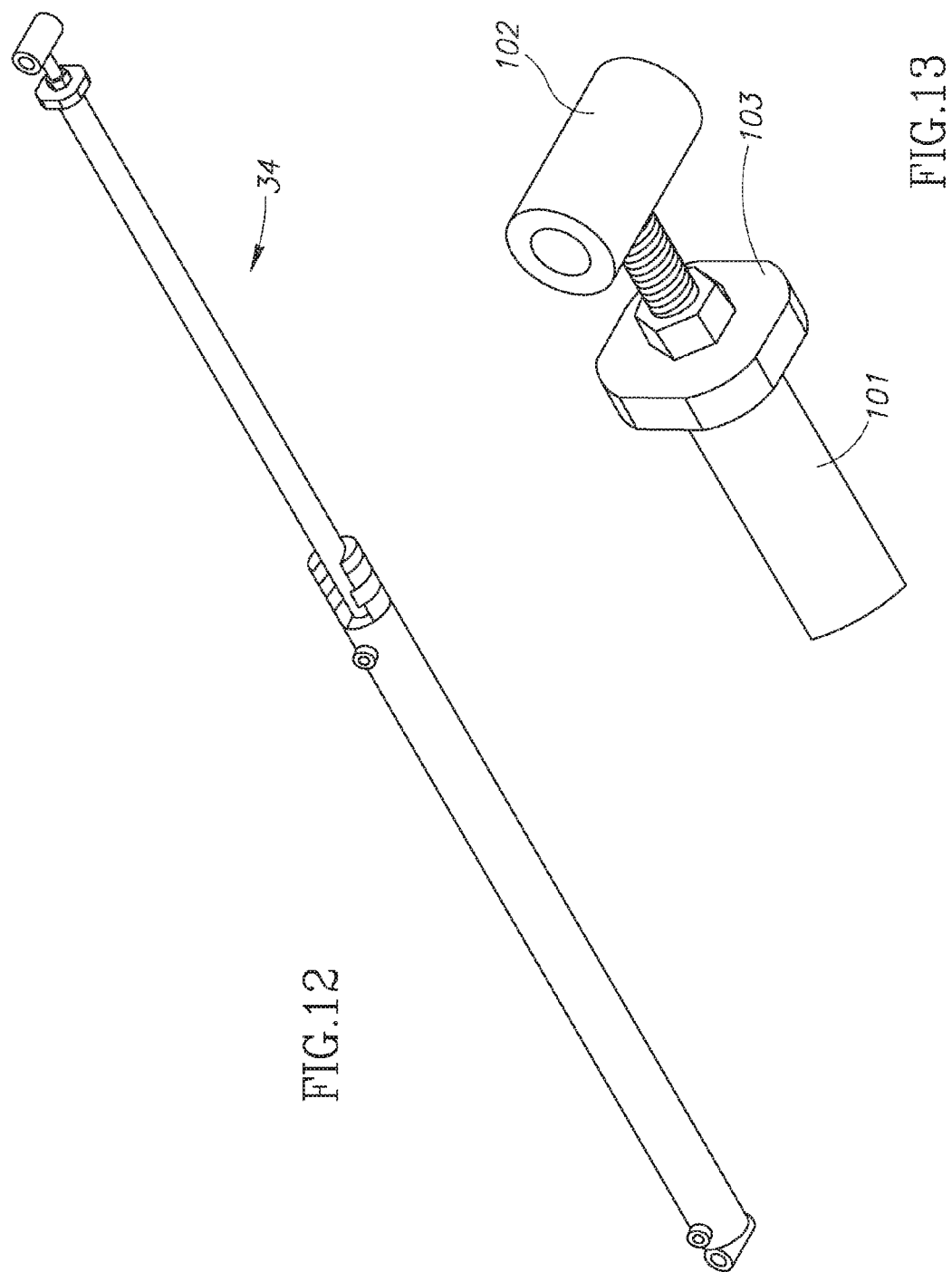

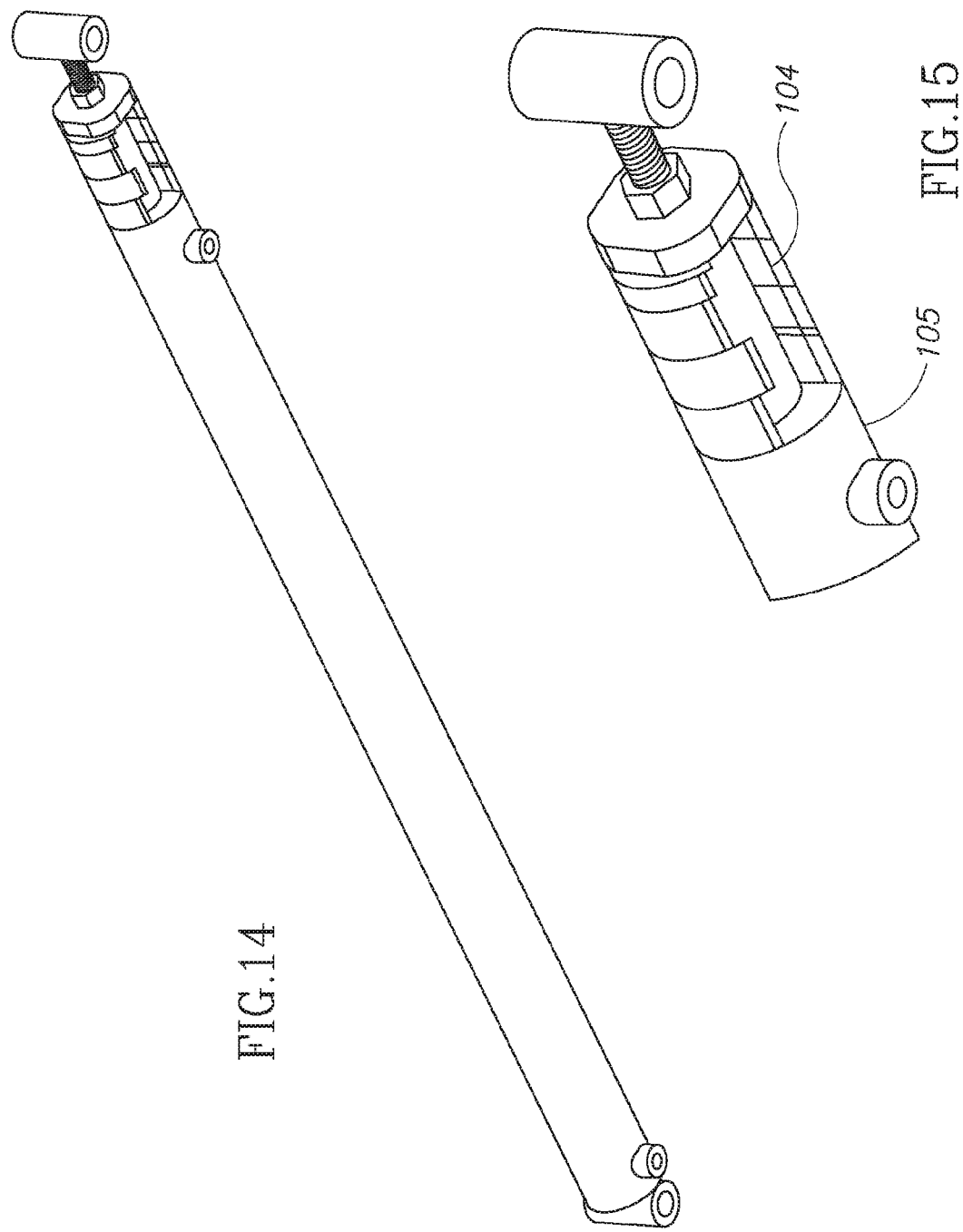

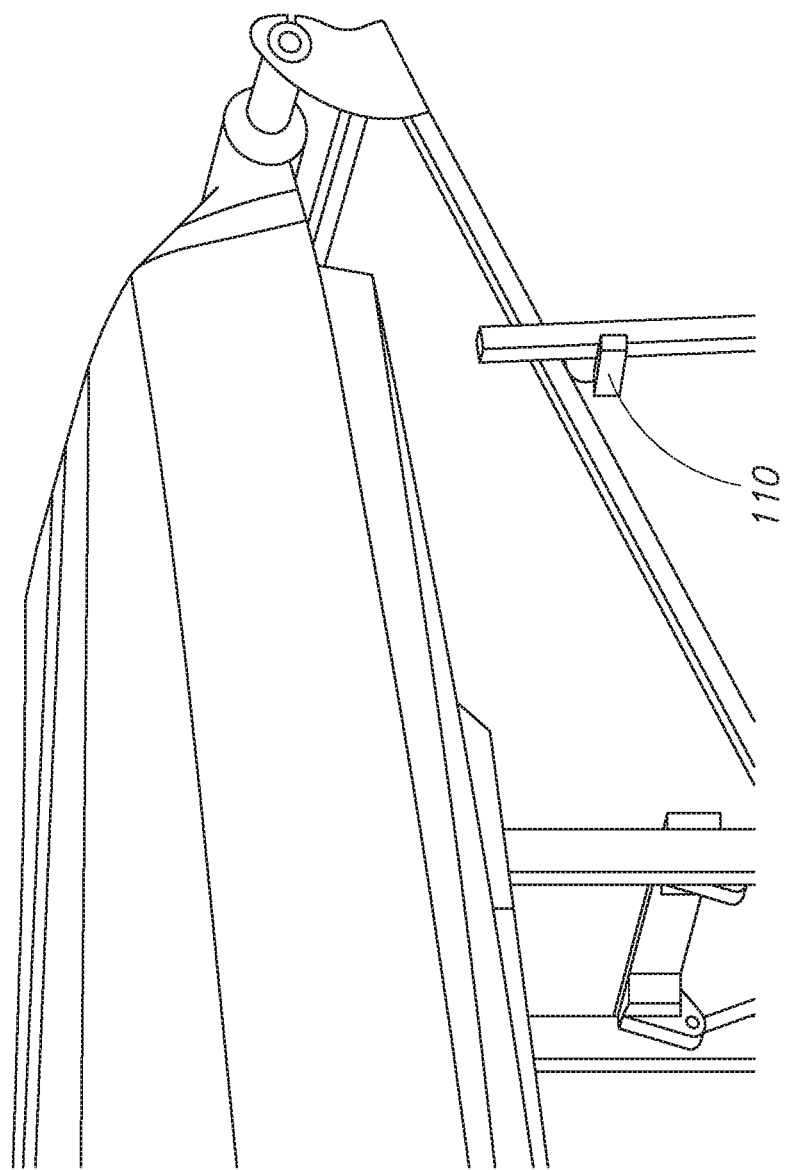

WATERCRAFT LIFT AND AUTOMATIC WATERCRAFT COVER

CROSS REFERENCE TO RELATED APPLICATION(S)

This application is a continuation of U.S. Non-Provisional application Ser. No. 14/708,054, filed on May 8, 2015, now U.S. Pat. No. 9,527,552, which claims the benefit of U.S. Provisional Patent Application No. 61/991,214, filed May 9, 2014.

BACKGROUND OF THE INVENTION

Field of the Invention

The present invention relates to free-standing and other watercraft lifts and watercraft covers for use with watercraft lifts.

Description of the Related Art

The use of boat covers to protect boats is well known. A number of designs are currently known to perform this basic operation. Many boats have multi-section covers, often with one covering the bow section and another covering the aft section. The covers are typically shaped to cover at least portions of the three-dimensional shape of a boat and are manually spread out over the boat and then manually attached using snap or other fasteners. The bow section is attached with fasteners around the perimeter of the bow section especially when there is a bow opening. The aft section is attached to fasteners on the windshield, or in front of the windshield, as well with fasteners around the perimeter of the aft section. This common cover system has several negative aspects for the user. The large number of snaps or other fasteners used make the covers time consuming to install. The covers are often difficult to install after the material ages. The covers are large and awkward to store on-board. The covers can be dirty, and unpleasant to handle. The covers tend to lose shape, causing pockets of water, which further cause a loss of shape and pools of water. The covers do not cover a significant amount of hull surface surrounding the covers, and do not cover significant portions of the sides of the boat with which used, which causes fading in the sun and does not protect these areas from dirt. The covers provide no security, which makes the contents of the boat and the boat itself vulnerable to theft.

Several two-dimensional automatic cover designs are currently known. U.S. Pat. No. 3,549,198 uses a rotating arm to pull a flat cover over the top of a dump truck to secure the contents. This design would not be ideal for use with a boat lift since the cover is two-dimensional, non-adjustable and would be impractical to fit the three-dimensional shapes of various boat types with which the lift might be used. The torsional spring of the roller is also subject to over-tightening.

It is known to use a two dimensional cover design similar to U.S. Pat. No. 3,549,198 for application on a portable boat lift with a pontoon boat. Such a design does not provide protection to the sides of the boat. It also is more vulnerable to side wind, since it has exposed edges that catch the wind. Both designs use a roller fixed to the front, and a set of arms which pull the cover rearward like a window shade. This type of design is undesirable for an application on a boat, since the cover slides over parts of the boat, causing cover wear, and potential boat damage. The fixed cover in the front also blocks views and is not attractive since the roller remains visible at the front even when the cover is deployed. Pulling the cover from a fixed roller in the front also can cause damage to the cover and boat by dragging the cover on the boat. Further, the lift with the cover similar to that described in the U.S. Pat. No. 3,549,198 does not provide any protection against operation of the lift when the cover is deployed, which can cause cover or boat damage, especially if installed on lifts that translate rearward when lowering, such as the lift of U.S. Pat. No. 5,908,264. Since the lift of this patent with the cover similar to U.S. Pat. No. 3,549,198 does not use the same remote control, another drawback is that the user is required to operate it separately from the automatic boat cover. It is also desirable to be able to manually adjust the cover when operating in case it is not seating correctly.

U.S. Patents such as U.S. Pat. Nos. 4,019,212 and 6,786,171 describe a cover system that does not touch the boat. These systems have a fixed roof with structure and retractable sides that completely surround the watercraft. The tall sides of these systems block views and are more vulnerable to wind. For use on a free-standing boat lift, the fixed roof structure can make the lift vulnerable to tipping. Because of the fixed roof, these systems often require permitting and are highly regulated.

U.S. Pat. No. 4,019,212 is a device that attaches to a free-standing boat lift and lifts the cover off vertically. This design requires an external frame and overhead structure to lift the frame. The design is not conducive to covering the full sides of the watercraft. Since the cover still creates a shadow over the water when the boat is off the lift, this design would often be regulated as a canopy or covered moorage and not as a boat cover.

U.S. Pat. No. 8,911,174 solves the challenges above, but did not address some additional challenges. In the U.S. Pat. No. 8,911,174 the starting and ending position of the roller is important for cover fit and cover storage position. In that patent, the starting and ending position of the swing arm is adjusted by moving the upper cylinder pivot position along the swing arm. This adjustment is complicated since an adjustment impacts both the forward and rear position at the same time. These adjustments are made underwater, making adjustments even more challenging.

The lift of the U.S. Pat. No. 8,911,174 pre vents lowering the boat with the cover on by using a hydraulic switching manifold that switches the operation from lift mode to cover mode, and will not switch to lift mode unless cover is fully off.

The U.S. Pat. No. 8,911,174 uses a torsion spring to roll up the cover and to apply tension on the cover, which is important for operating the cover in the wind. Since more cover tension can be perceived as beneficial, the operator can over tension the torsion spring and cause spring damage.

The automatic boat cover of the U.S. Pat. No. 8,911,174 is costly, largely due to the hydraulic and control systems.

Applying the U.S. Pat. No. 8,911,174 to a boat lift with a lifting cradle, lifted by cables, is challenging since the pivot position under the boat may limit minimum water depth. If the pivot position is raised, the loads applied to the swing arm get very high as the angle of the arm gets very shallow in the forward and rear positions.

The automatic boat cover of the U.S. Pat. No. 8,911,174 uses a custom fit cover for the boat. The design of this cover is difficult for some boats that have protruding features such as antennas and/or fishing gear.

BRIEF DESCRIPTION OF THE SEVERAL VIEWS OF THE DRAWING(S)

FIG. 12 is an isometric view of the adjustable length hydraulic cylinder.

FIG. 13 is an isometric view of the adjustable screw end of the hydraulic cylinder.

FIG. 14 is an isometric view of the hydraulic cylinder shown in a retracted position.

FIG. 15 is an enlarged isometric view of the retracted hydraulic cylinder end.

FIG. 18B is an enlarged aft, port side portion of the lift of FIG. 18A.

DETAILED DESCRIPTION OF THE INVENTION

Figure 1:
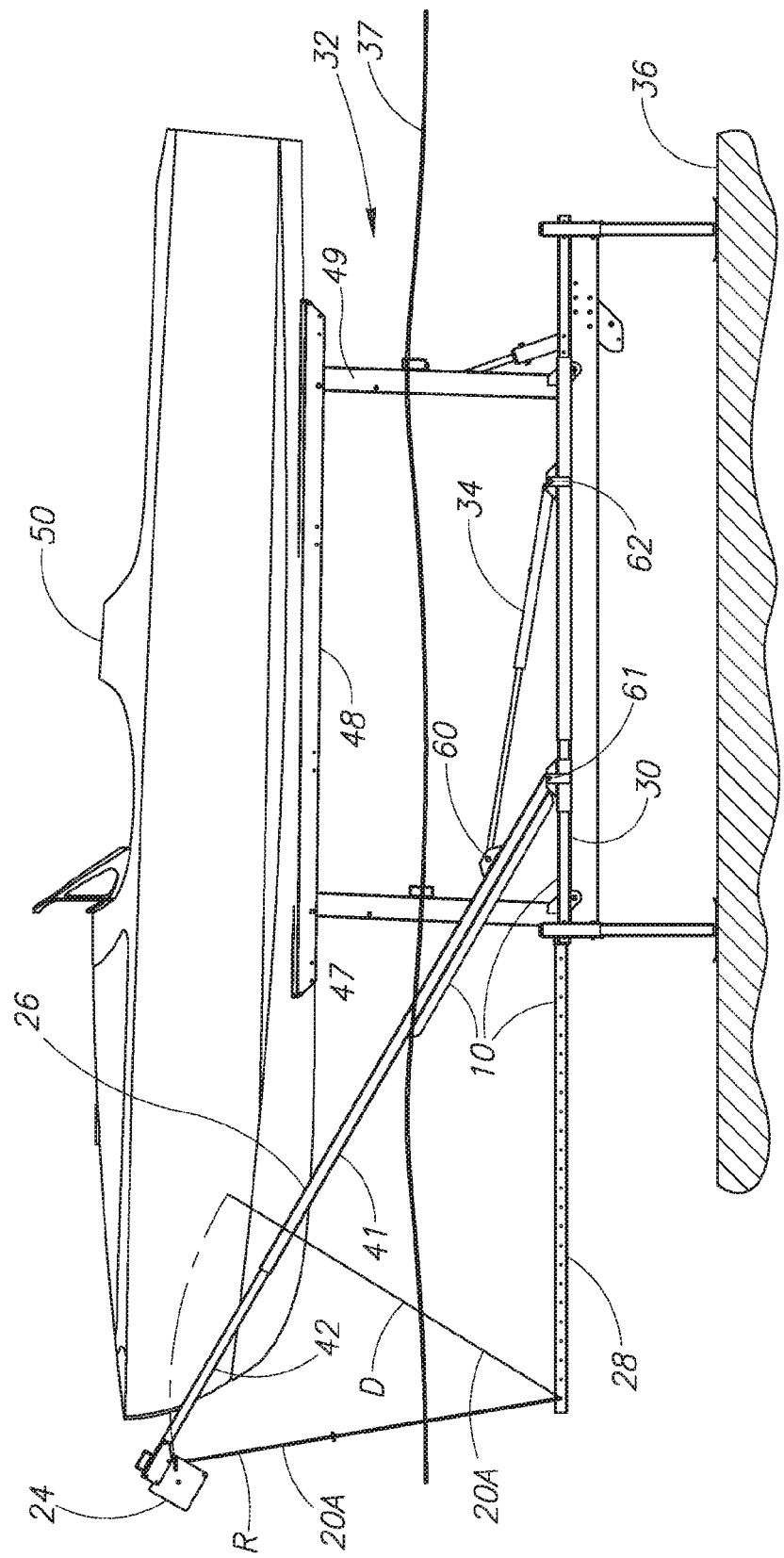
FIG. 1 is a side view of a boat on a lift in accordance with an embodiment of the present invention with the cover in an 'Off' position.

The invention generally relates to a watercraft lift system generally used for lifting powerboats under 30 feet long, however, the design could be applied to other type boat and watercraft lift systems and other type boats and watercraft. U.S. Pat. No. 8,911,174 is incorporated herein by reference in its entirety.

The disclosed embodiments of the invention are illustrated for a watercraft lift system that allows for simple installation and removal of the cover, better protection for the boat or other watercraft being lifted, less view blockage, and better theft prevention. The combination of these features saves the boater time before and after boating, reduces hull cleaning, reduces hull fading, and allows the owner to store equipment, such as water skis inside the boat more securely.

According to the watercraft lift system disclosed herein, one may set the forward swing arm angle by fully extending the hydraulic cylinder, and fine-tune the swing arm angle by changing the length of the hydraulic cylinder with a screw end fitting on the cylinder shaft. To set the rearward angle, the cylinder shaft can be stopped by using shims on the cylinder shaft.

According to the watercraft lift system disclosed herein, the lift can also be disabled using a limit switch on the cover mechanism that prevents lowering when the cover is on the boat.

The hydraulics described in the U.S. Pat. No. 8,911,174 can be eliminated if the swing arms are pulled rearward mechanically as the bunks of the lift are raised, and visa versa. If the torsional spring force is strong enough to retract the cover, a cable can be used to drive the swing arms rearward, and the roller can pull the swing arms forward by pulling on the cover. According to another embodiment, a rotational motor may be used to reel the cover in and out without using a torsion spring.

In another embodiment, a mechanical stop is fixed to push the cover arm rearward as the lift raises.

In a further embodiment, the high loads on the lifting cradle of the U.S. Pat. No. 8,911,174 maybe reduced by actuating the swing arm using a cable on a track that guides the cable to a distance away from the pivot to get reduced loads.

To simplify cover design, multiple hoops are positioned over the boat, so the cover rests on the hoops for much of the boat instead of the boat. The cover can still hook on to the bow, and the cover may touch parts near the rear of the boat. In another embodiment, the cover attaches to another hoop instead of hooking on to the bow.

As shown in the drawings for purposes of illustration, a boat 50 is supported by a boat lift 32 using port and starboard (left and right side) boat lift bunks 48. The boat lift 32 may use rollers or other means for supporting the boat thereon. The boat lift 32 includes port and starboard forward lift legs 47 and port and starboard rearward lift legs 49 which are telescopically connected directly or indirectly through crossbeams or otherwise to port and starboard side rails 30 of the frame of the boat lift 32.

Port and starboard swing arms 26 are, respectively, pivotally connected to the port and starboard side rails 30 at port-side and starboard-side pivot locations 61 by a pivot channel, and are each simultaneously moved by operation of a corresponding port and starboard hydraulic cylinder 34. Each of the port and starboard swing arms 26 includes a lower base arm portion 41 and an upper arm portion 42 telescopically disposed within the base arm portion and by which the length of the swing arm can be selectively adjusted to fit the boat 50 with which the boat lift 32 is being used. The length of swing arm 26 is adjusted by sliding the upper arm portion 42 farther out of the base arm portion 41 or farther into the base arm portion, then securing the upper arm portion in place within the base portion.

The port hydraulic cylinder 34 has a lower end pivotally connected to the port side rail 30 or another frame member of the boat lift 32, and an upper end pivotally connected to the port swing arm 26. The starboard hydraulic cylinder 34 has a lower end pivotally connected to the starboard side rail 30 or another frame member of the boat lift 32, and an upper end pivotally connected to the starboard swing arm 26. To deploy the cover 22, the hydraulic cylinder 34 may move from an extended position (shown in FIG. 1) to a retracted position (shown in FIG. 3). The retracting movement of the hydraulic cylinder 34 causes the swing arms 26 to move from a forward position to a rearward position. The roller 24 allows the cover 22 to unwind and extend over the boat while the swing arms 26 move from the forward position to the rearward position. To retract the cover 22, the hydraulic cylinder is moved from the retracted position (shown in FIG. 3) to the extended position (shown in FIG. 1). The extending movement of the hydraulic cylinder 34 causes the swing arms 26 to move from a rearward position to a forward position. The tension in the torsion spring 97 causes the roller 24 to wind the cover 22 back into the roller 24 when the swing arms 26 move from the rearward position to the forward position. A controller in the hydraulic powerpack 66 may send a control signal to the hydraulic cylinder 34 causing the hydraulic cylinder to extend or retract.

The starting and ending position of a roller tube 24 is adjusted by positioning the lower pivot 61 and lower cylinder pivot 62 along the side rail 30, and the upper arm portion 42 of the swing arm 26 in the base arm portion 41 of the swing arm 26. The forward position of the swing arm 26 is set by adjusting the end fitting cylinder shaft 102 of the hydraulic cylinder 34. Screwing the end fitting cylinder shaft 102 inward to the hydraulic cylinder 34 increases the angle of the swing arm (see FIGS. 12-15). Conversely, screwing the end fitting cylinder shaft 102 out of the hydraulic cylinder 34 decreases the angle of the swing arm 26. The angle of the swing arm 26 in the rear position may be adjusted by stopping the full retraction of the cylinder shaft 101 using shims 104 on the cylinder shaft 101, between the cylinder body 105 and the shaft plate 103 (see FIGS. 14 and 15).

Figure 9:
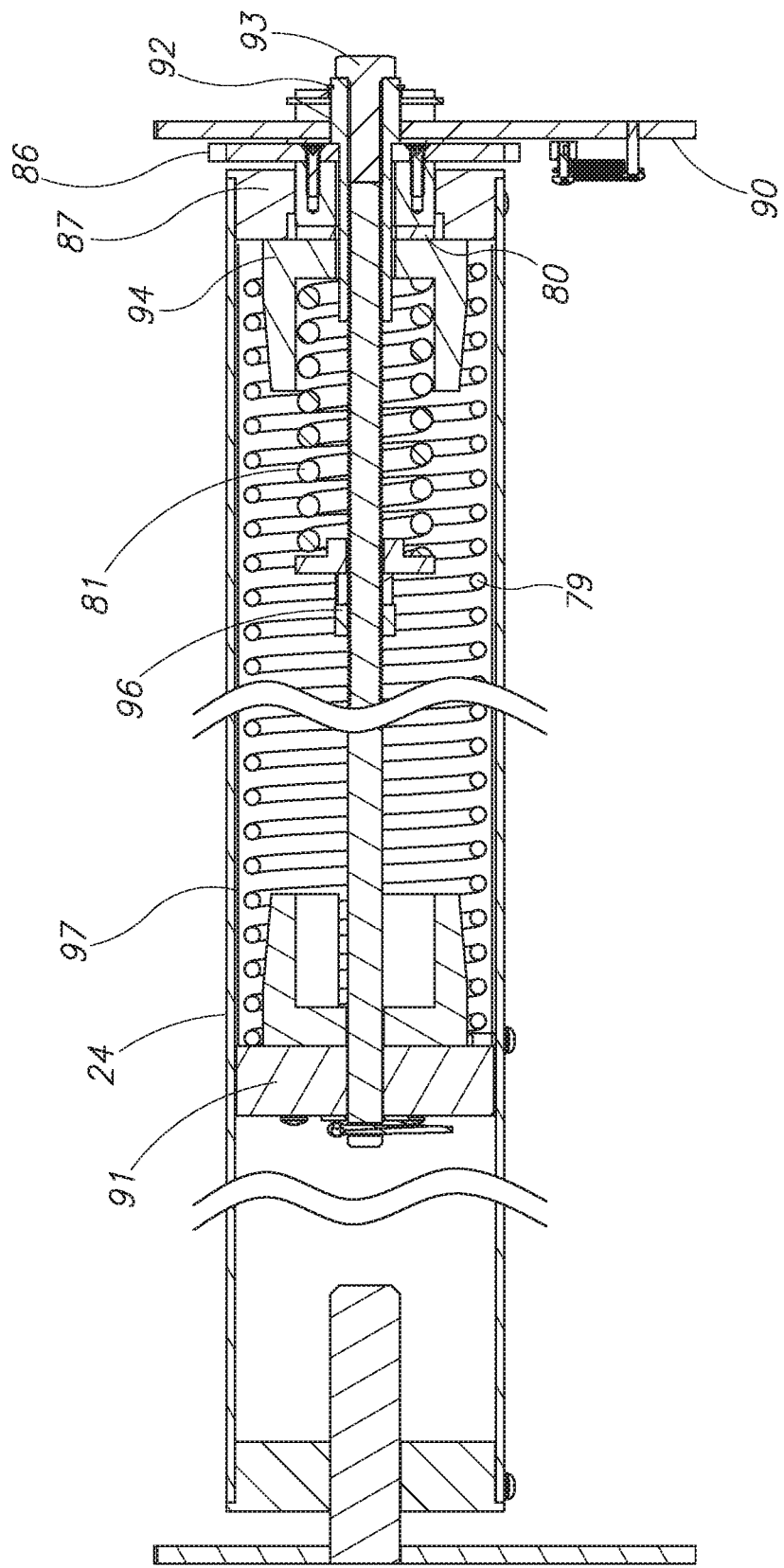
FIG. 9 is a section view of the slip clutch side of the roller assembly.
Figure 10:
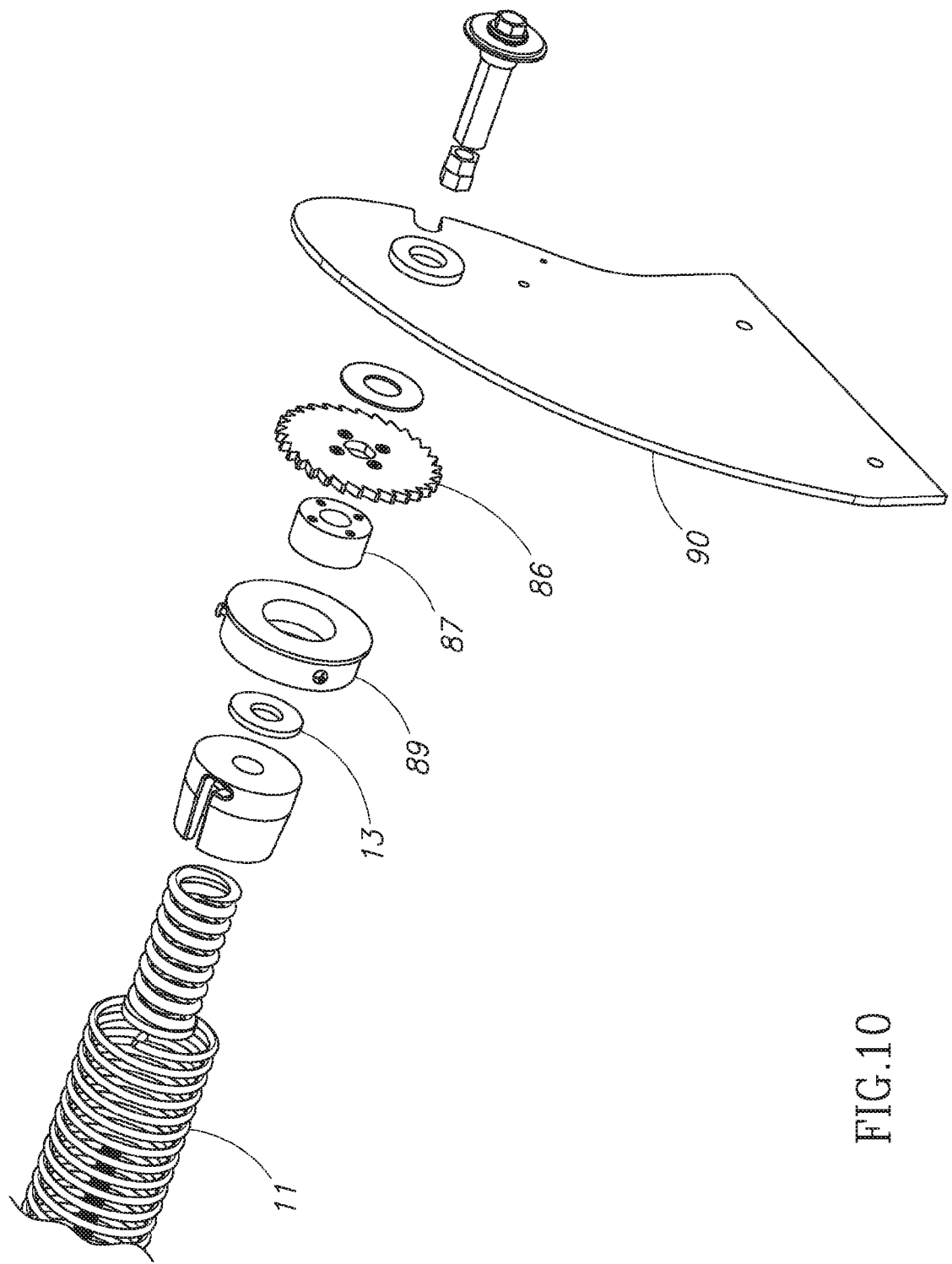
FIG. 10 is an isometric exploded view of the slip clutch side of the roller assembly.

The roller tube 24 extends laterally between and is rotatable relative to the end portions of the upper arm portions 42 of the port and starboard swing arms 26. As seen in FIG. 9, a torsional spring 79 is positioned within the roller tube 24 and applies adjustable rotation force to the roller tube and hence a pulling force to a cover 22 attached thereto.

In another embodiment, a motor (not shown) is mounted on one end of the roller 24 instead of the torsional spring 97. A controller (in hydraulic powerpack 66) may send a control signal to the motor causing the motor to reel the cover 22 in or out as the swing arms 26 move. For example, when hydraulic powerpack 66 sends a control signal to the hydraulic cylinder 34 to retract (cover the boat) and move the swing arms 26 to the rearward position, the hydraulic powerpack 66 may also send a control signal to the motor causing the motor to unwind the cover 22. Conversely, when hydraulic powerpack 66 sends a control signal to the hydraulic cylinder 34 to extend (uncover the boat) and move the swing arms 26 to the forward position, the hydraulic powerpack 66 may also send a control signal to the motor causing the motor to wind the cover 22 back into the roller 24. The motor and hydraulic cylinder 34 may be controlled in concert to ensure that the cover 22 is not ripped or otherwise damaged. Alternatively, an actuation member may apply a rearward load on the swing arm 26 so that when the motor lets the cover out, the swing arms 26 move rearward. The motor could be electric or hydraulic driven.

Figure 2:
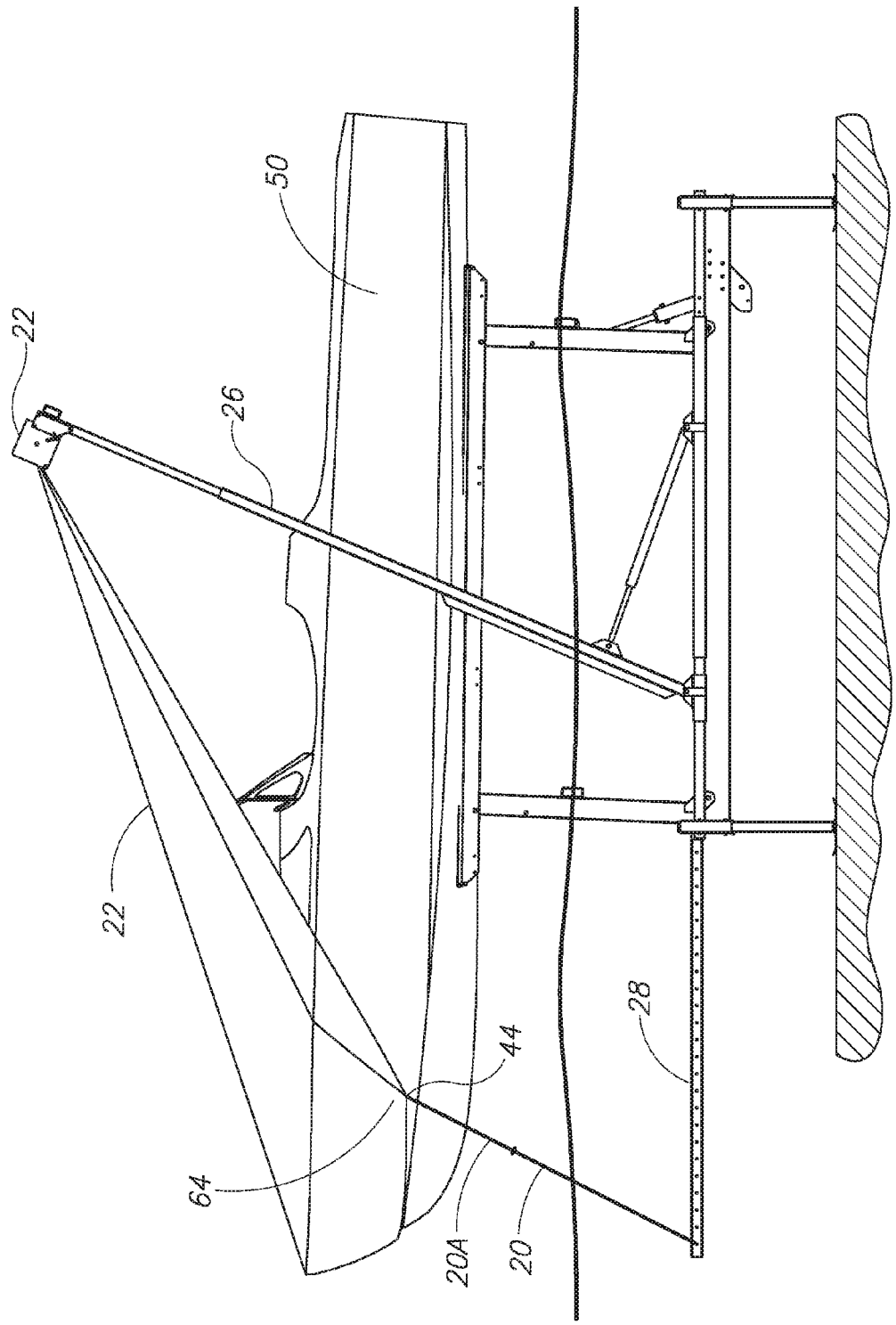
FIG. 2 is a side view of the boat on the lift with cover in a 'Partially On' position.
Figure 4:
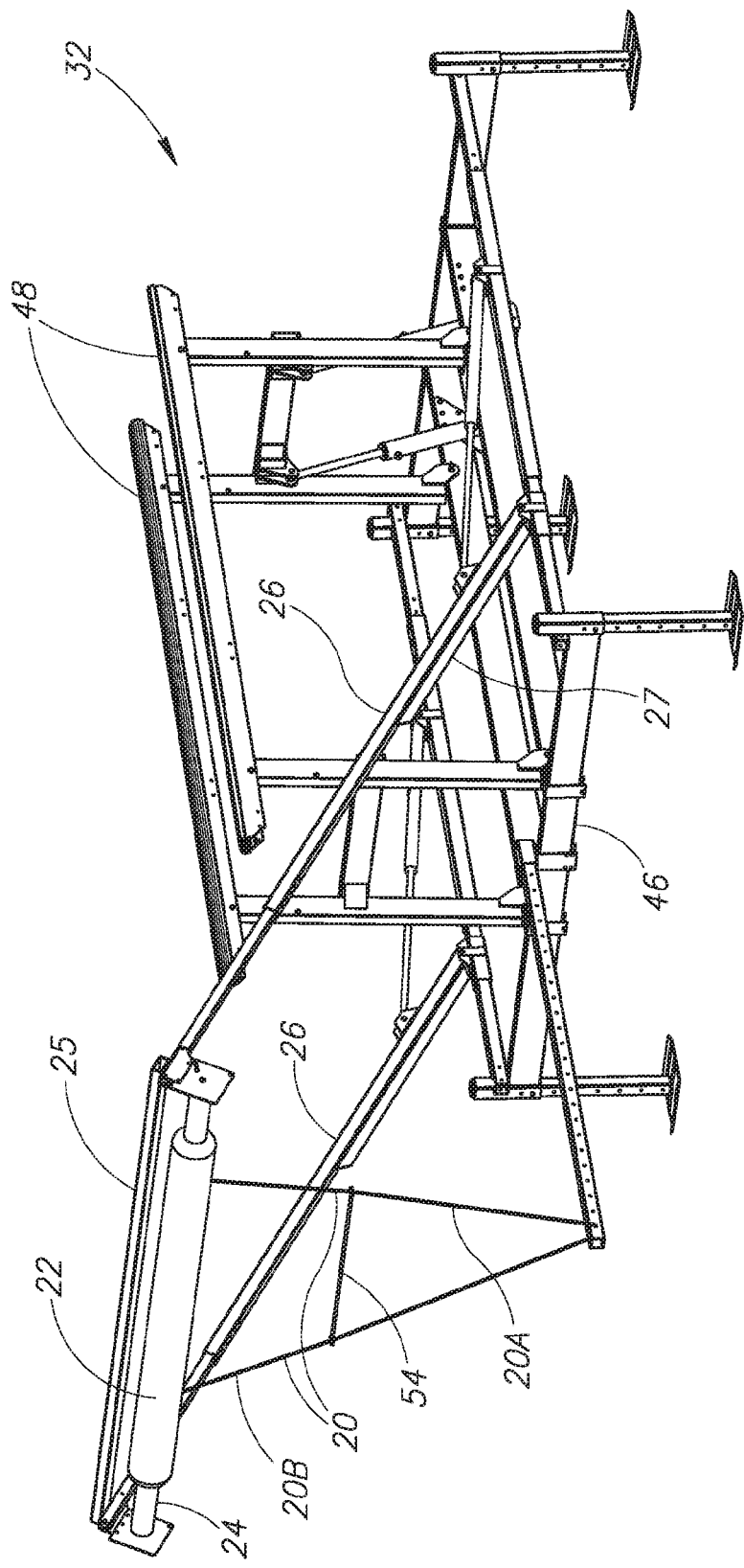
FIG. 4 is an isometric view of the lift and cover without a boat.

The front of the cover 22 has a pocket sized to accept therein the bow of the boat 50 when the cover is deployed to cover the boat (see FIG. 2). A forward cover line 20 extends between the front of the cover and a forward end portion of a bow sprit 28 which has a rearward end portion attached to a forward transverse frame beam 46 of the boat lift 32 (see FIG. 4). The forward cover lines 20 connect between the bowsprit 28 and the forward section of the cover. In the preferred embodiment, one forward cover line 20A attaches to a port side forward wing 64 of the cover, and the other forward cover line 20B attaches to a starboard side forward wing 65 of the cover. A spreader bar 54 separates the port and starboard cover lines 20A and 20B, and helps to prevent the cover from snagging on wide-bow boats. The forward cover lines 20 are depicted in the deployed position and the retracted position in FIG. 1 (only cover line 20A being visible). Another embodiment uses a line extending from port and starboard attachment points 44 and 45 on the cover to the boat lift frame directly, without using a bow sprit, such as to the forward transverse frame beam 46 of the boat lift 32 or to a bow stop accessory that mounts to the boat lift bunks 48. Another embodiment uses a single line attaching the front of the cover 22 to the boat lift 32. Another embodiment secures the front of the cover to a fixed point below the bow so a bow sprit 28 would not be needed.

Figure 6:
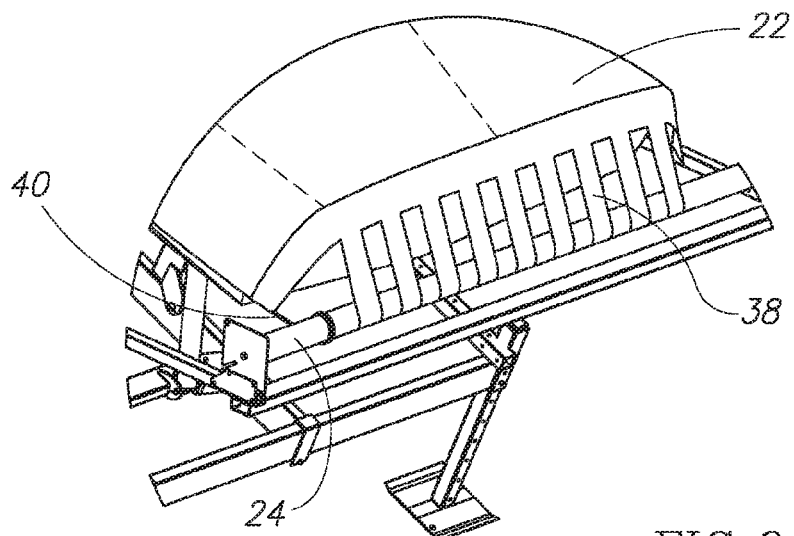
FIG. 6 is an isometric view of the lift with a boat showing rear details of cover.
Figure 7:
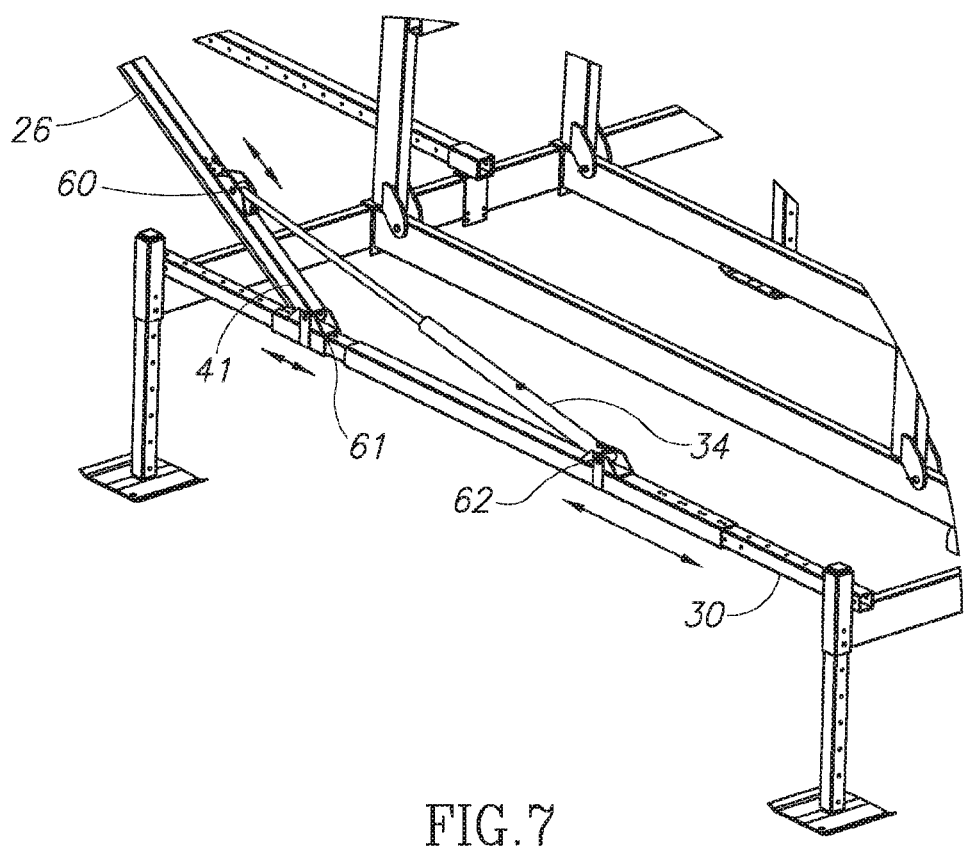
FIG. 7 is a side view of an adjustable arm of the lift.
Figure 8:
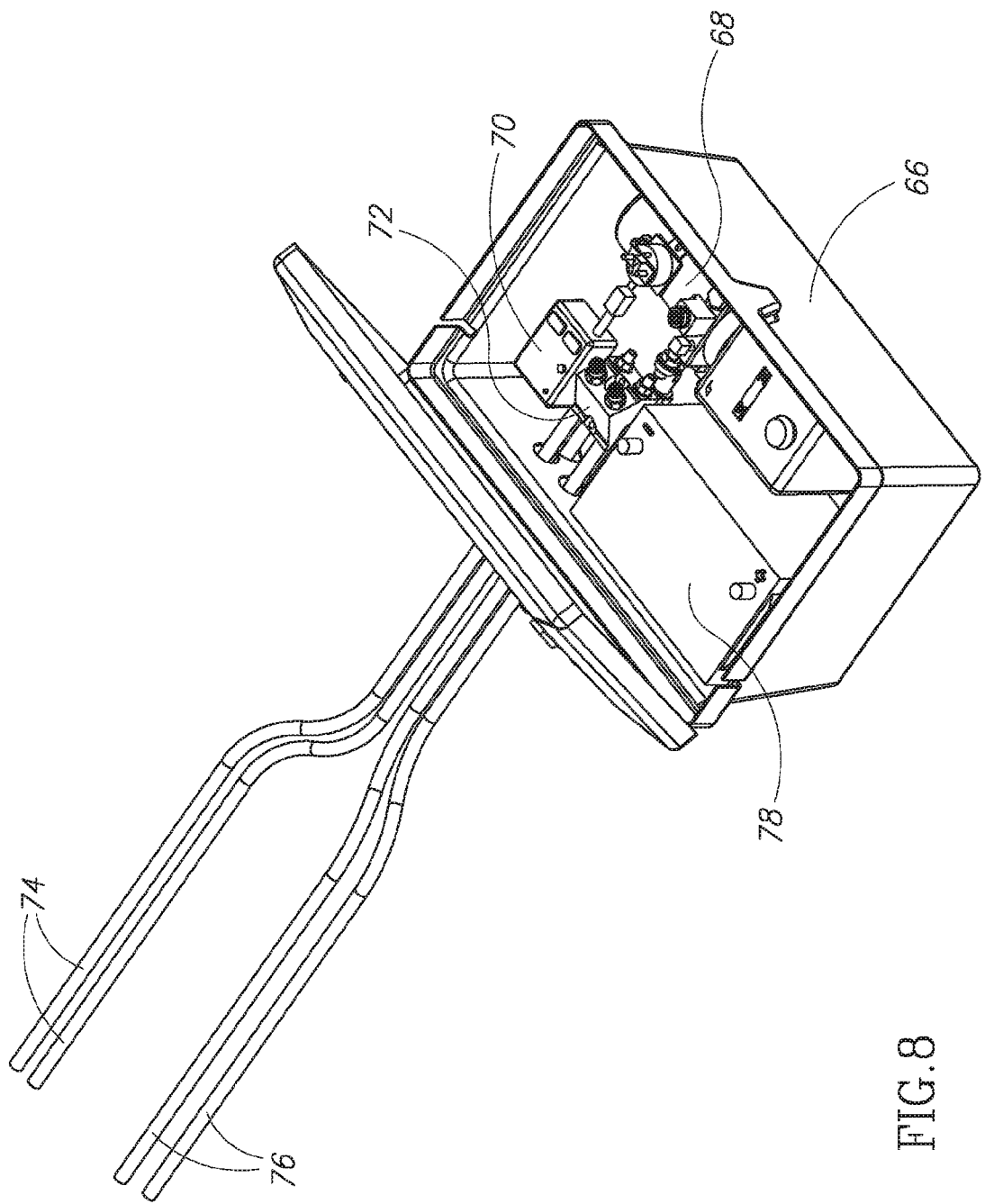
FIG. 8 is an isometric view of a hydraulic powerpack of the lift.

The perimeter of the cover 22 has an edge pocket with an elastic cord 40 extending through the edge pocket (see FIG. 6). When the cover 22 is fully deployed on boat 50, the elastic cord is tightened by being wrapped around the roller tube 24 in the opposite direction than the cover for the first few wraps so that the elastic cord 40 is tensioned when the roller tube 24 is pulled aft, and is loosened when roller tube 24 moves forward and the cover 22 begins to be rolled up on the roller tube 24.

Figure 3:
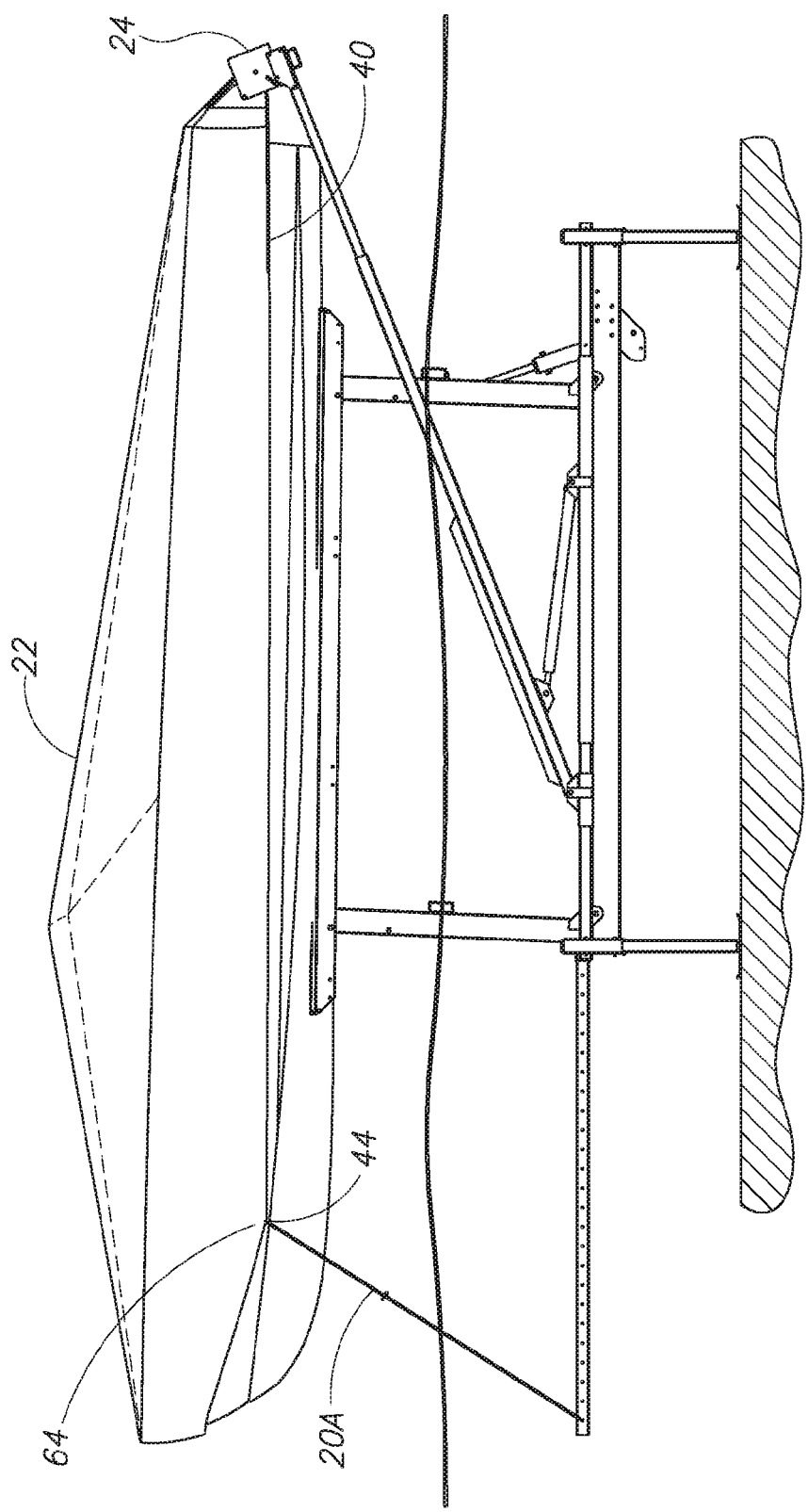
FIG. 3 is a side view of the boat on the lift with cover in an 'On' position.
Figure 5:
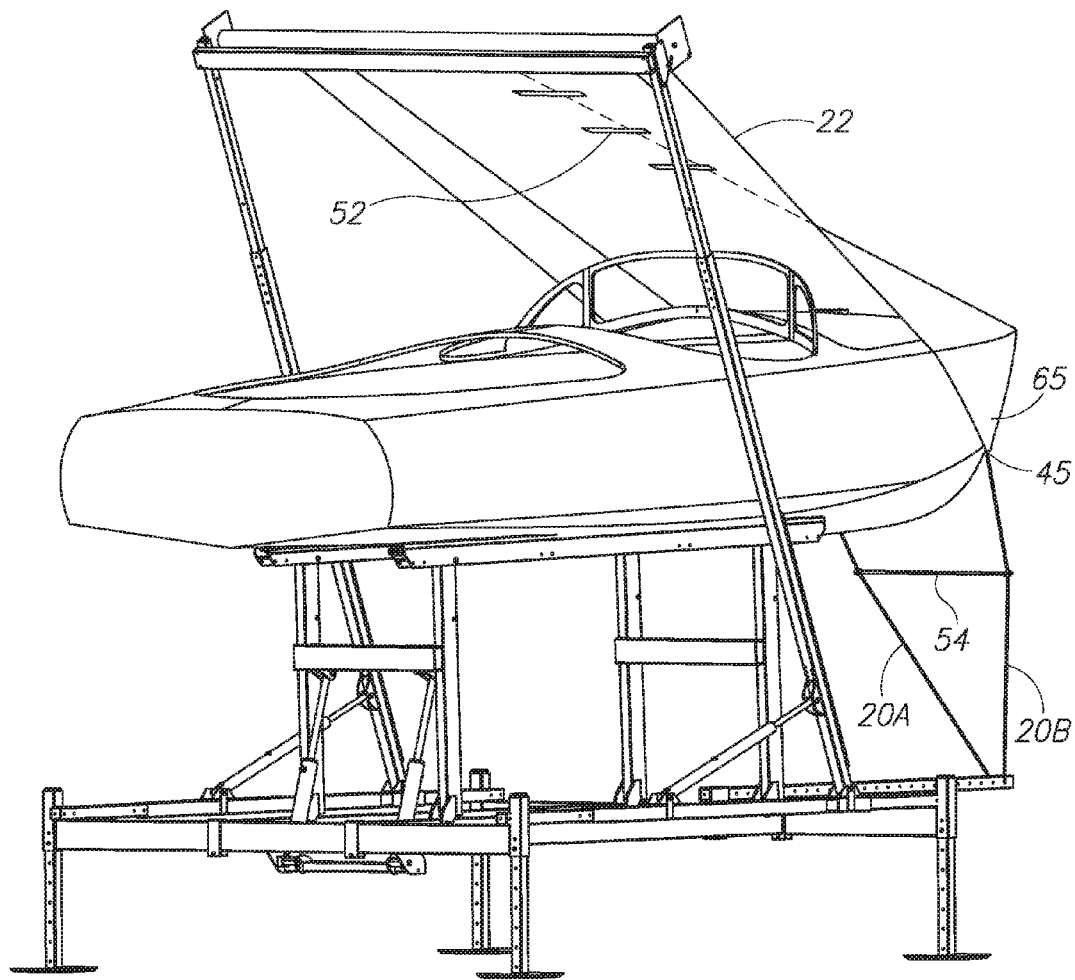
FIG. 5 is an isometric view of the lift and cover showing inner handles.

The preferred embodiment of the cover 22 uses forward side wings 64 and 65 which are designed to better secure the cover to the sides of the boat (see FIGS. 3 and 5).

As seen in FIG. 6, the aft end of the cover 50 is attached to the roller tube 24 with a multiplicity of elastic members 38 to assist to keep cover tight on boat 50.

The cover 22 has a plurality of interior handles 52 which assist the operator in positioning the cover if needed.

The length of swing arm 26 is adjusted by sliding the upper arm portion 42 farther out of the base arm portion 41 or farther into the base arm portion, then securing the upper arm portion 42 in place within the base arm portion 41.

The lower pivot of swing arms 26 can be adjusted fore and aft by where the base arm portion 41 is attached along the side rail 30 to change the position the pivot location 61 of each swing arm.

A hydraulic powerpack 66 operates the boat lift 32. After the lift 32 is in a fully up position, the control system switches the control to the cover, and the cover 22 can be moved to the 'On' position. When the cover is fully retracted, the control shifts to operate the lift, allowing the lift 32 to lower.

The illustrated embodiment is a hydraulic lift. In this embodiment, the switching of control can be done hydraulically from the lift to the cover with sequencing valves which automatically switch the system from 'Lift mode' to 'Cover mode' when the lift reaches the fully up position. The system switches back to 'Lift mode' when the cover is fully removed when the cover cylinder is fully extended.

The hydraulic powerpack 66 includes a hydraulic power unit 68, a control box 70, a hydraulic switching manifold 72 and a battery. The hydraulic hoses 74 for the lift 32 and the hydraulic hoses 76 for the cover system 10 connect to the hydraulic switching manifold 72. The battery 78 powers the hydraulic power unit 68, and the control box 70 operates the hydraulic power unit 68. The hydraulic switching manifold directs the flow to the hydraulic hoses 74 for the lift 32 or the hydraulic hoses 76 for the cover system 76. The control box 70 can be operated by a manual two way switch or with a remote control.

Figure 11:
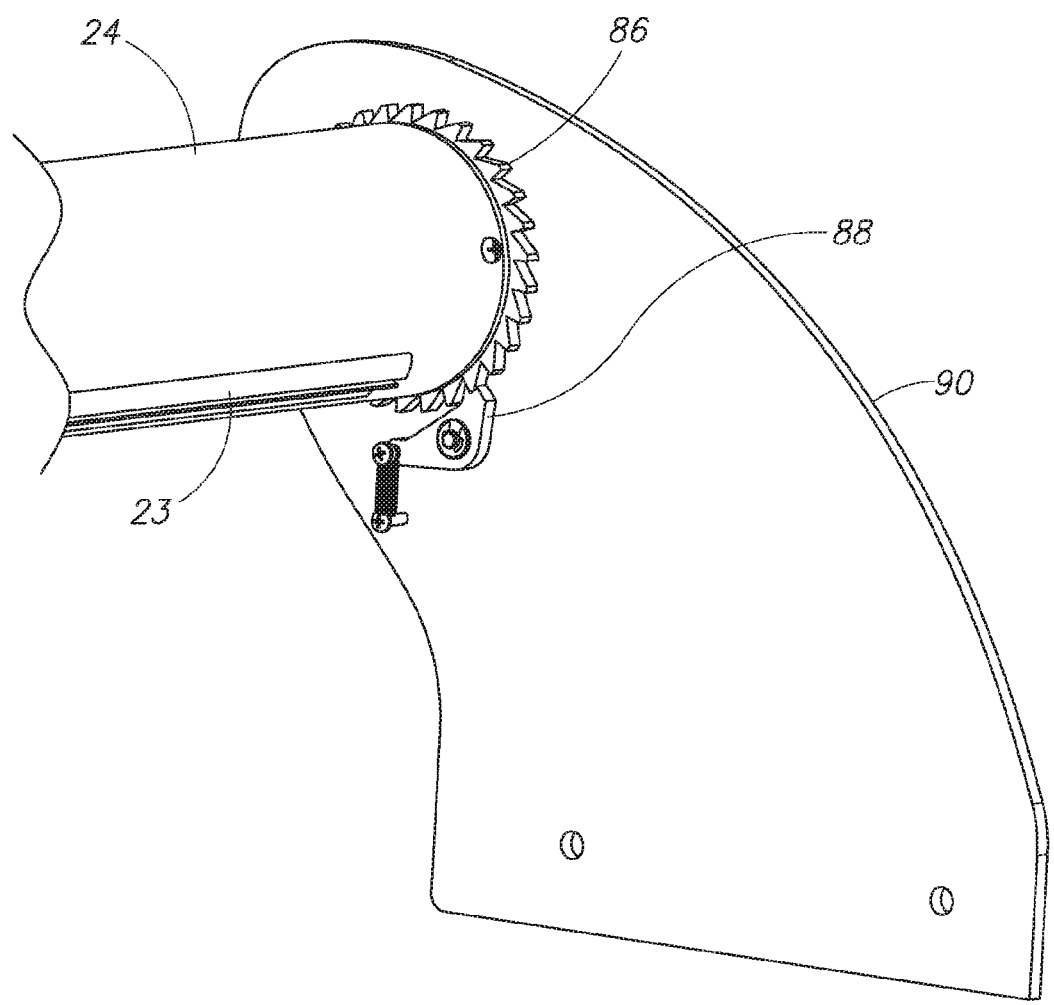
FIG. 11 is an isometric view of the clutch side of the roller assembly.

The roller tube 24 is torsionally loaded by the torsion spring 79 that extends longitudinally within the roller tube, as shown in FIG. 9. The torsion spring 79 has a first end secured to a spring mount 95 attached to the roller tube 24. A second end of the torsion spring 79 is attached to another spring mount 94, which is connected to an end plate 90 via a friction clutch 80, a centering puck 87 and a ratchet plate 86. The ratchet plate 86 is constrained to rotate in one direction by a locking pawl 88, as shown in FIG. 11. The torsion spring 79 is preloaded by turning a bolt 93, which turns a pin 92. The pin 92 turns the ratchet plate 86, centering puck 87, friction clutch 80 and spring mount 94. The first end of the torsion spring 79 is restrained by the spring mount 95.

The roller 24 is designed to prevent over-torqueing or overloading the torsion spring 79. If the torque exerted on the torsion spring 79 exceeds a pre-set torque limit by either (i) excessive preloading by turning the bolt 93, or (ii) rotating the roller tube 24 too many times during operation, the spring mount 94 will slip to relieve torque. That is to say, the spring mount 94 will slip (rotate) relative to the ratchet plate 86 and centering puck 87, with the friction clutch 80 being between the relative rotating parts. This slip will relieve torque load on the torsion spring 79, preventing damage. The pre-set torque limit (maximum torque limit) on the torsion spring 79 may be set by compressing a clutch spring 81 against the friction clutch 80. The clutch spring 81 is positioned within and concentric with the torsion spring 79. The compression of the clutch spring 81 against the friction clutch 80 is set using a double nut 96 on a threaded section of a longitudinally extending axle 91. The axle 91 extends concentrically within the torsion spring 79 and the clutch spring 81. This configuration effectively prevents over-tensioning of the torsion spring 79 by using the friction clutch 80 as slip clutch.

A spring sock 97 between the torsion spring 97 and the roller tube 24 reduces noise and wear, and separates the torsion spring 97 material from the roller tube 24 material. In the preferred embodiment, this roller assembly with slip clutch is used for an automatic boat cover system with swing arms 26. Another embodiment would be for an automatic boat cover system that uses tracks to guide the positioning of the roller. Another embodiment uses a cover system having the roller assembly with slip clutch to cover a wheeled vehicle with an open-box top, such as a dump truck, pickup truck, or a trailer with an open-box frame.

The non-hydraulic version has the swing arm 26 mounted on a non-moving part of a boat lift 32, or to the adjacent dock structure, or sea bed 36. As the translating part of the boat lift 102 moves upward, the swing arm 26 is pulled rearward by a flexible actuation member 126. By way of non-limiting example, if the actuation member 126 is a cable, the cover 22 may be reeled in on the roller as the lift is lowered, due to the torsion in the roller tube 24, as seen in FIG. 16.

Figure 19:
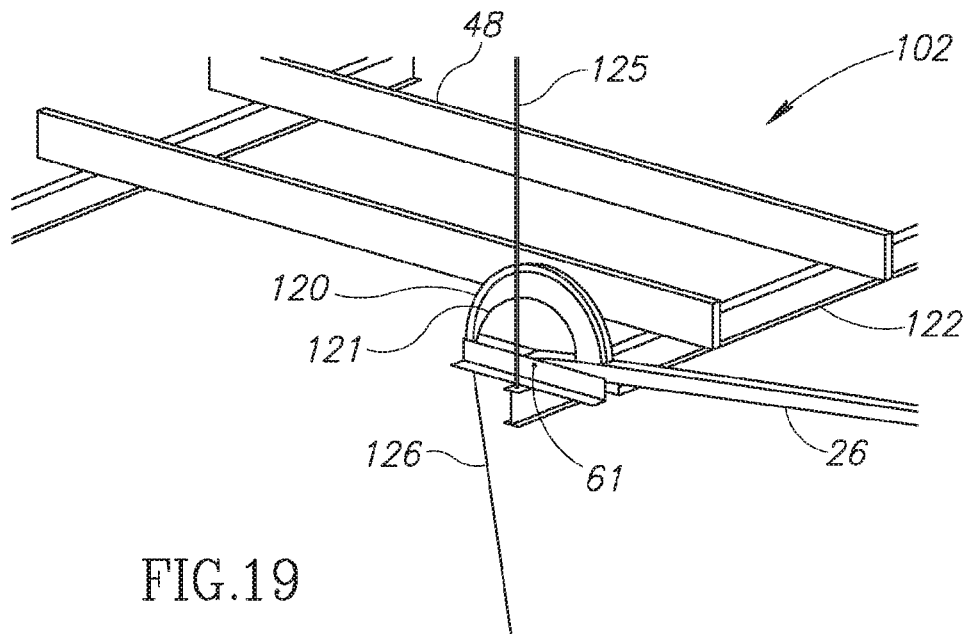
FIG. 19 is an isometric view showing a cable actuated swing arm in rear position, with a guide track.
Figure 20:
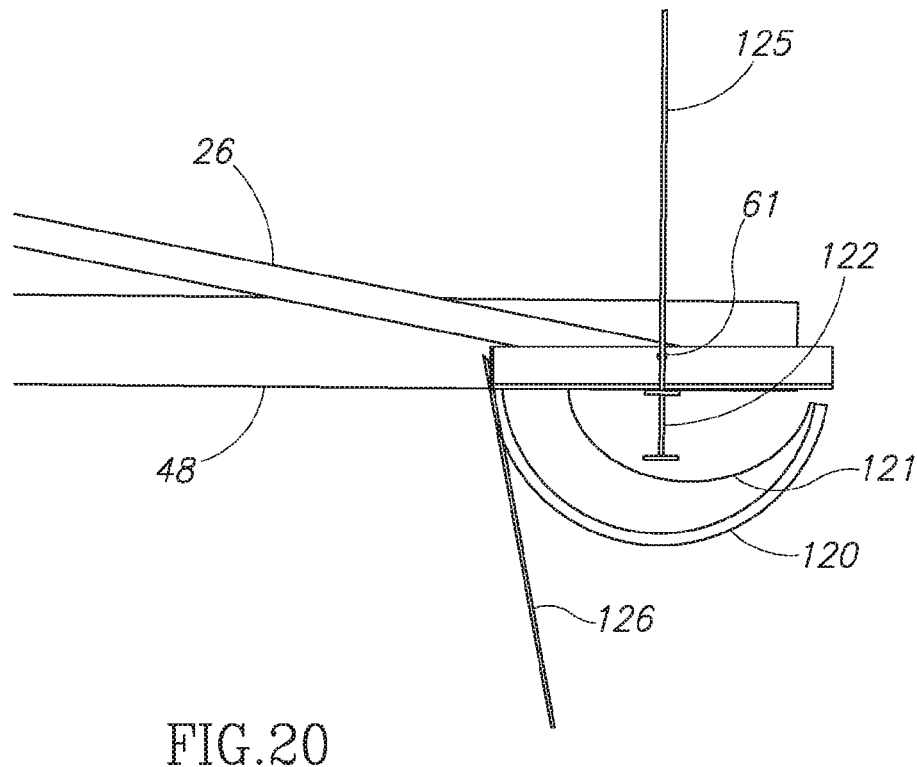
FIG. 20 is a side view of a cable actuated swing arm in forward position.
Figure 21:
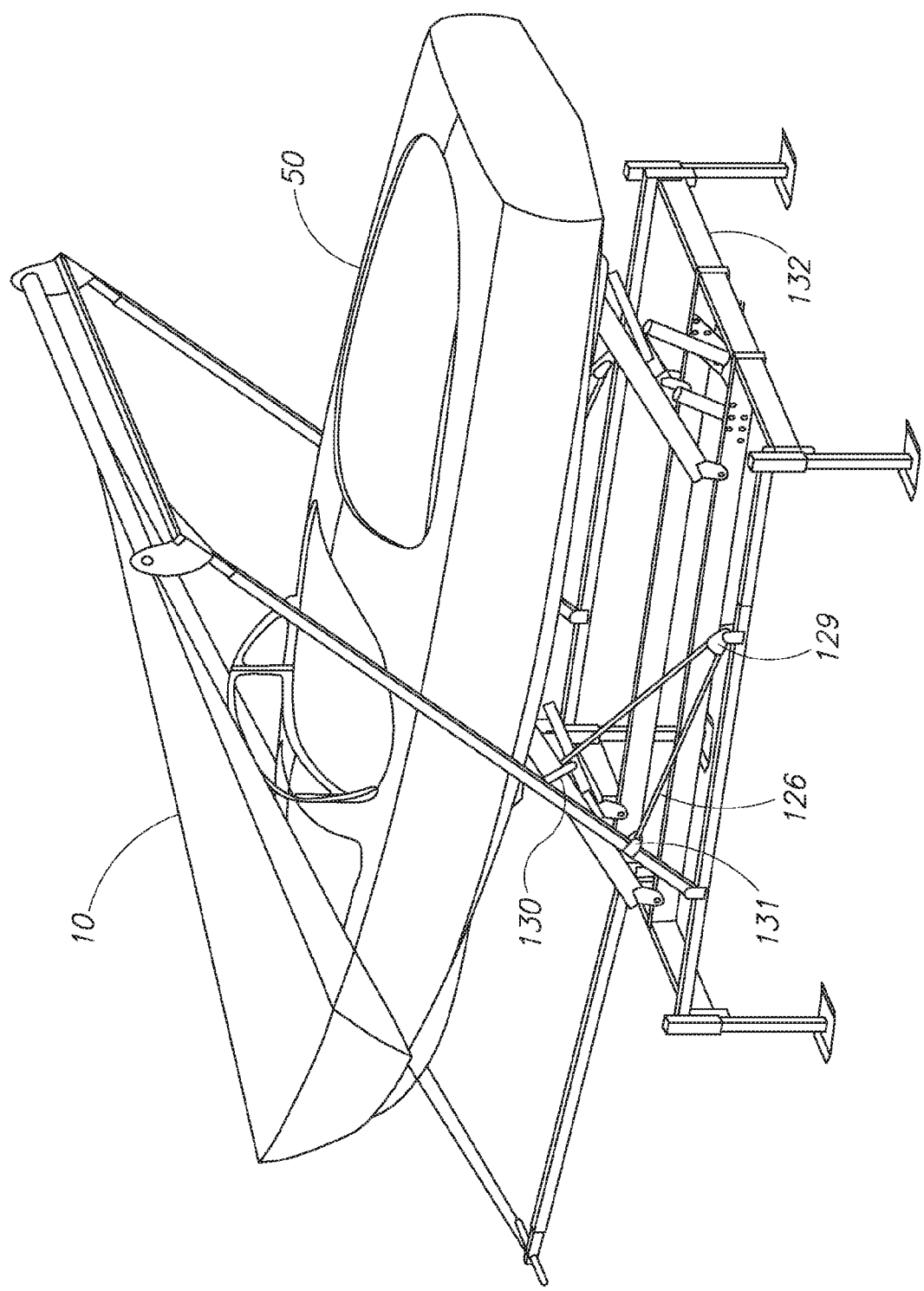
FIG. 21 is a portable boat lift with a cable actuated automatic boat cover.
Figure 22:
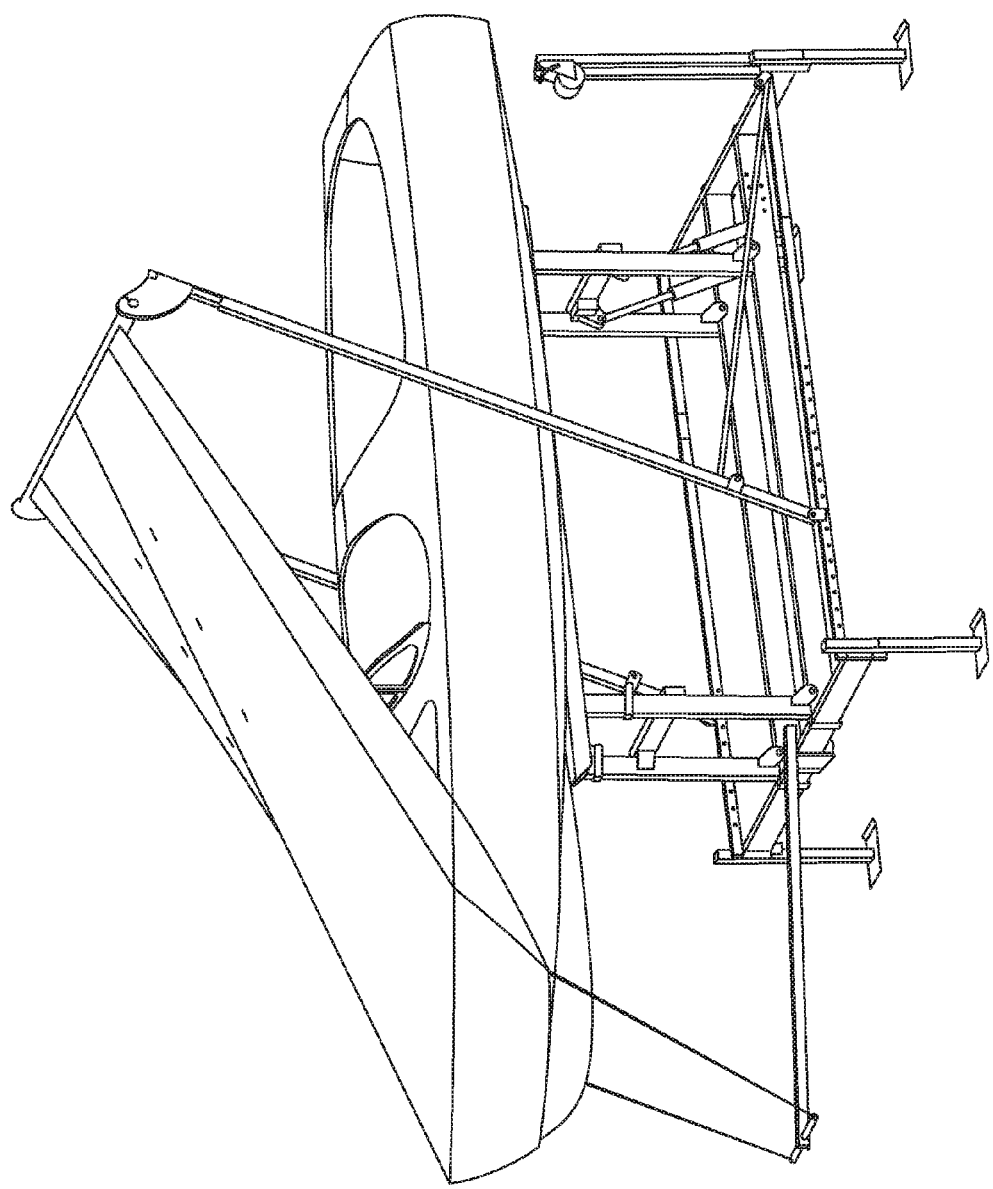
FIG. 22 is an isometric view of a boat lift with a cable actuated automatic boat cover with a winch.
Figure 23:
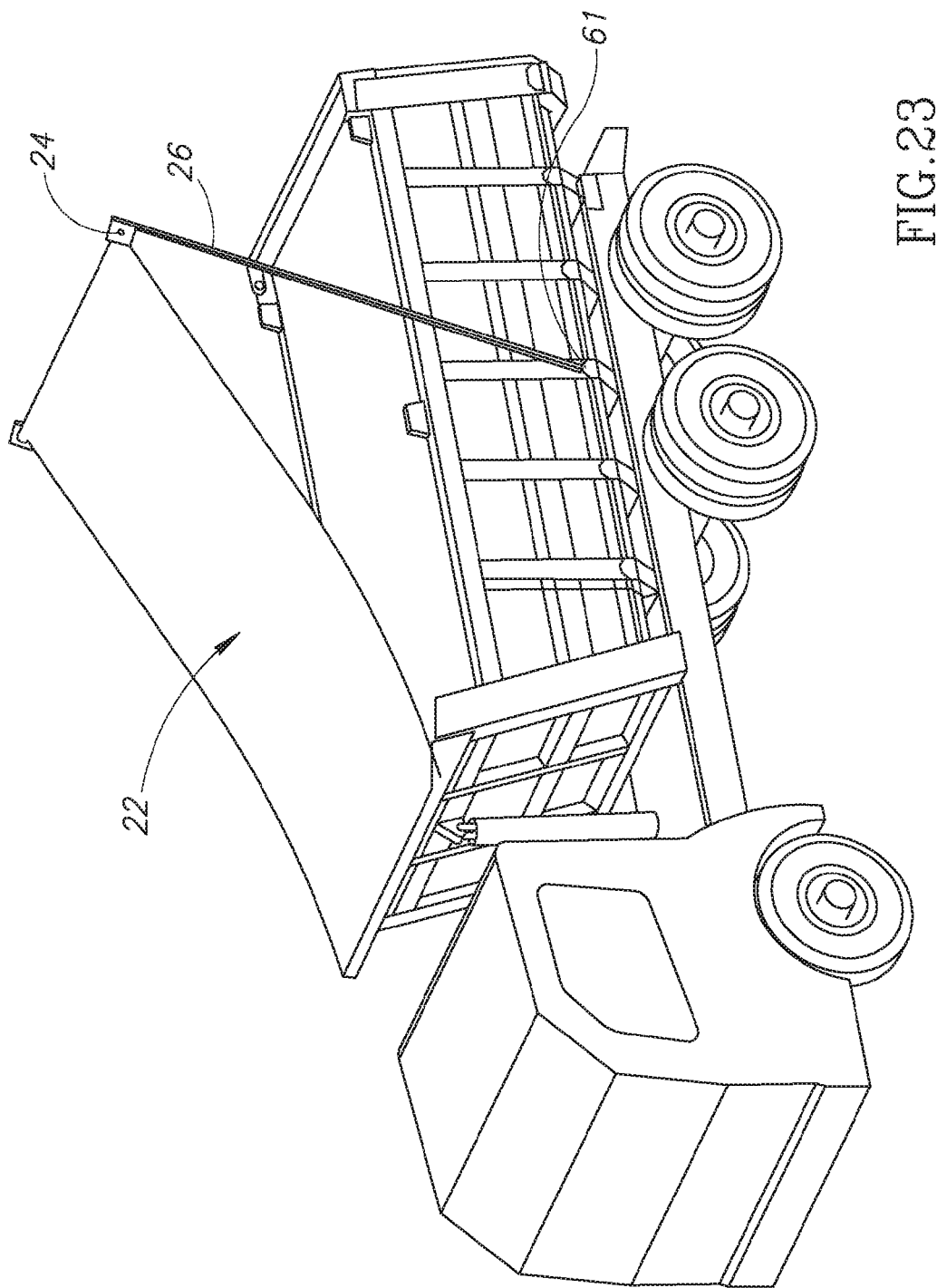
FIG. 23 is an isometric view of an automatic cover system used with a wheeled vehicle.

A preferred embodiment has a guide track 120 on the swing arm that accepts the actuation member 126, as shown in FIGS. 19 and 20. This guide track 120 positions the actuation member 126 (cable) optimally relative to the swing arm pivot 61 to reduce peaks in loads in the cable as the swing arm 26 moves. The shape of the guide track support 121 allows for clearance if the swing arm pivot 61 is mounted on the boat lift cradle support 122. In another embodiment, the cable actuated automatic cover system may be used in a portable 4 bar linkage boat lift, such as the boat lift 32 shown in FIG. 21. In this embodiment, the cable is pulled by moving parts, such as the bunks or lifting arms. In another embodiment, the swing arm 26 is pulled rearward with an actuation member 126 (cable), which is being pulled by a winch 128, shown mounted on the boat lift 32. Another embodiment has the winch 128 mounted on the dock or piling 127.

Figure 18A:
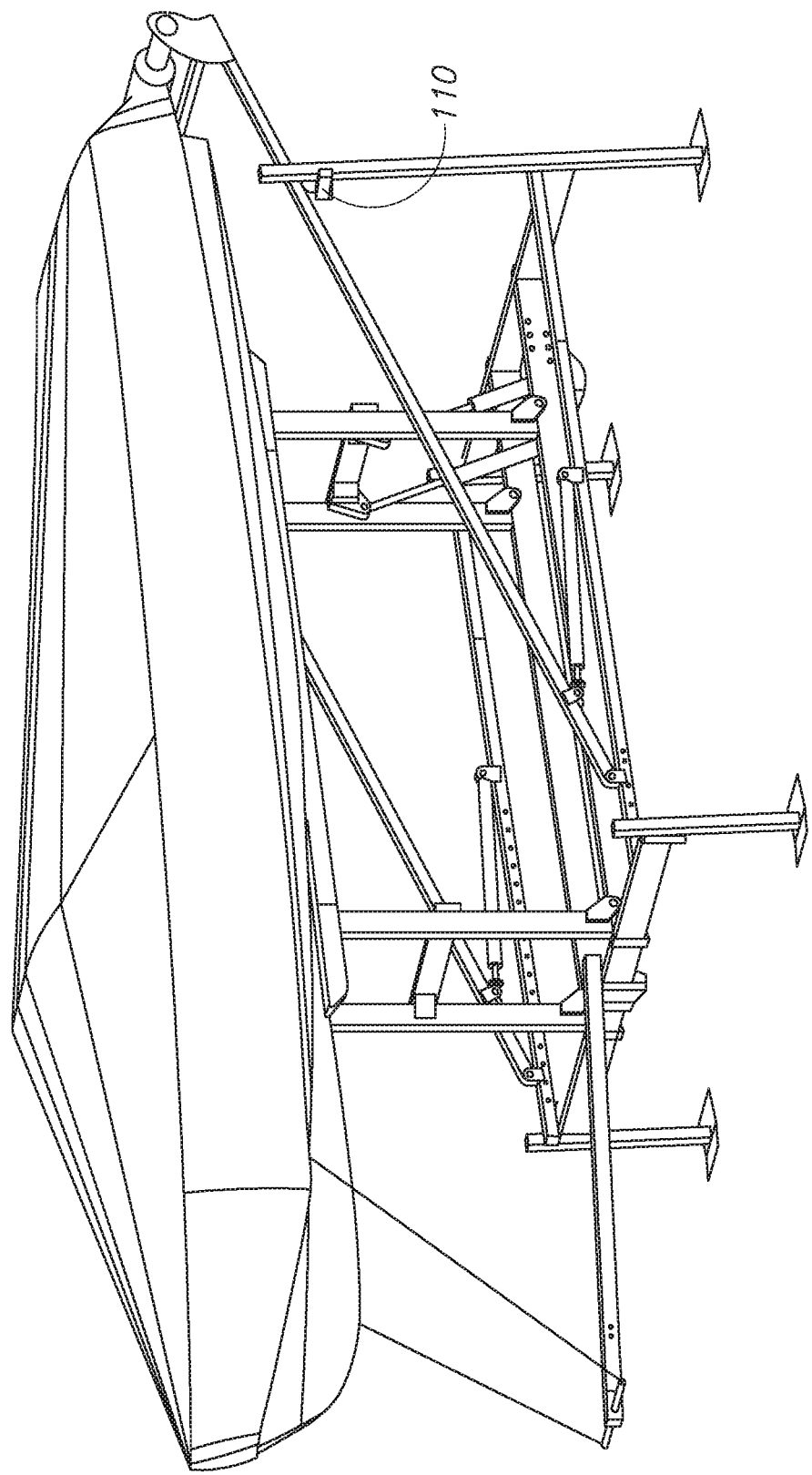
FIG. 18A is a side view of the lift of FIG. 1 showing a limit switch.

Another method of preventing accidental lowering of the lift with the cover on is to include a limit switch 110, as shown in FIGS. 18A and 18B. The limit switch 110 detects when a swing arm 26 is in a certain position. For example, the limit switch may sense when at least one of the swing arms 26 are forward, and the cover 22 is on the boat. In FIGS. 18A and 18B, the limit switch senses that one of the swing arms 26 are rearward and that the cover 22 is on the boat. A control system connected to the limit switch determines a position of the swing arms 26 based on a signal sent from the limit switch 110. The control system prevents the boat from lowering unless the limit switch 110 senses that one or both of the swing arms 26 are forward and cover 22 is off.

Figure 16:
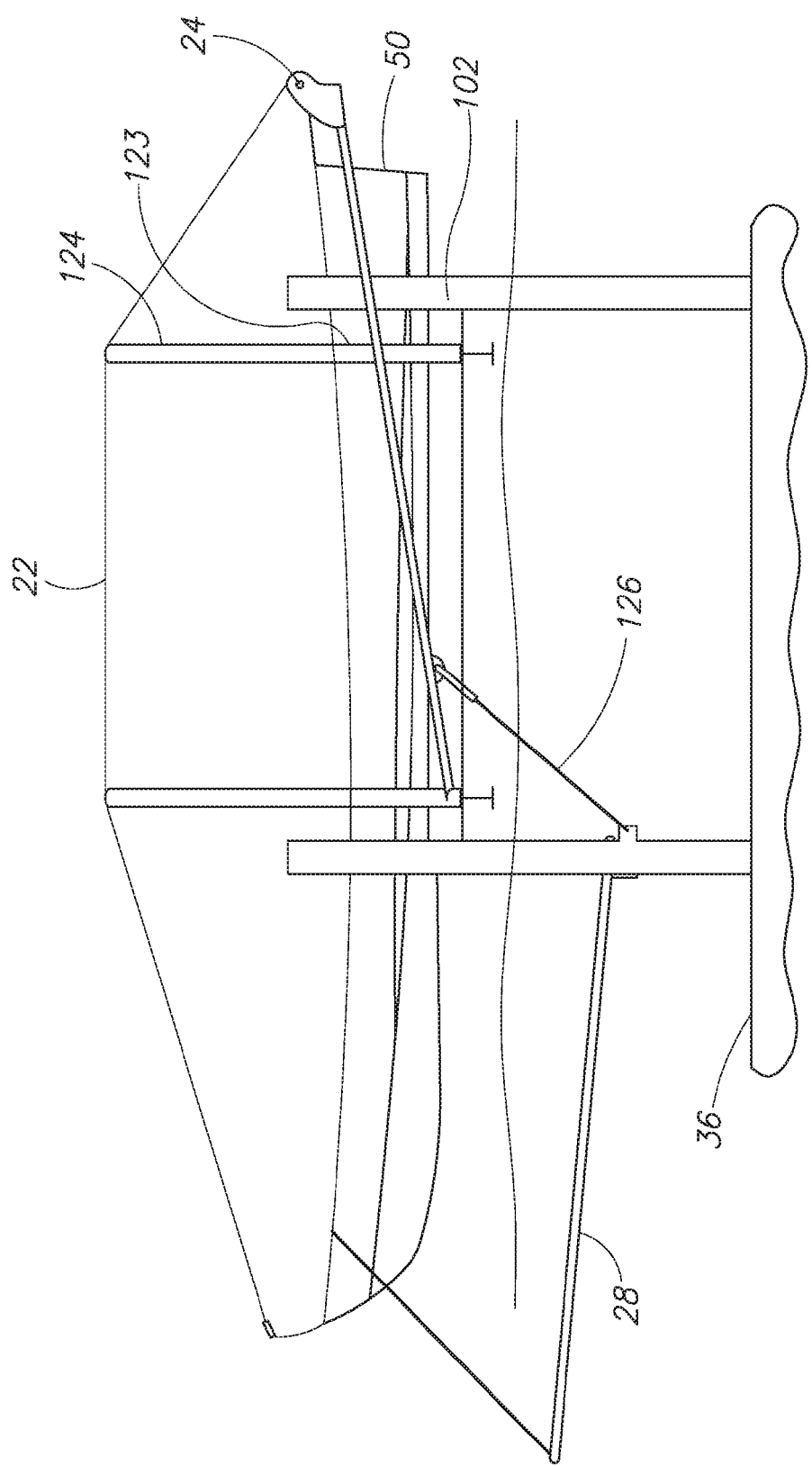
FIG. 16 is a side view of the swing arm actuated by the boat lift.
Figure 17:
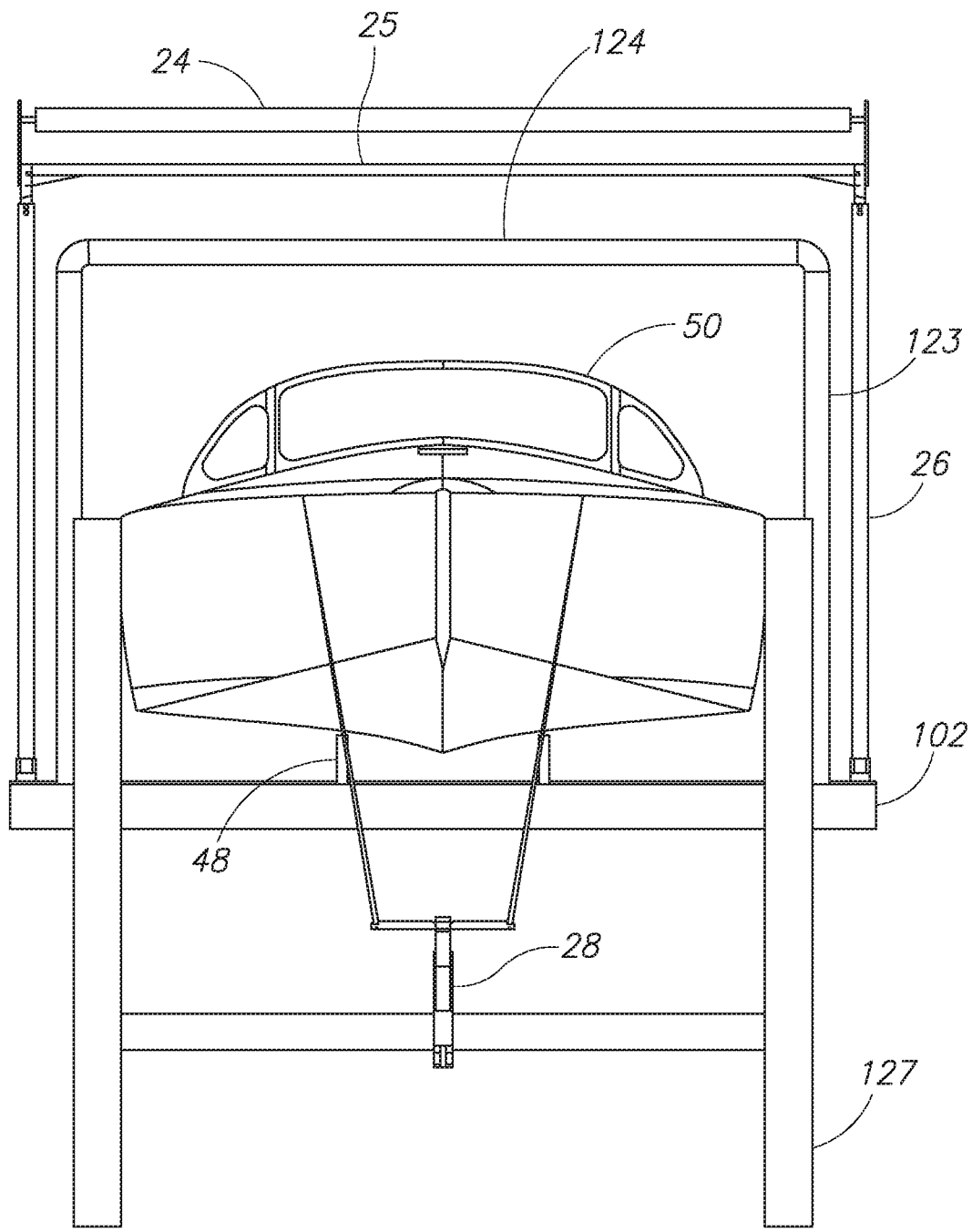
FIG. 17 is a front view of the swing arm actuated by the boat lift and the cover hoops.

In yet another embodiment, the cover 22 may extend over hoops 123 to cover the boat 32, as seen in FIG. 16. When the cover 22 is moved from the forward position to the rearward position, the cover 22 covers the front of the boat 32, extends over the hoops 123, and covers the back of the boat 32. Hoops 123 may attach to the top or sides of guide posts 122 of the boat lift 32. When the cover 22 covers the boat 32 and the hoops 123, the cover 22 is partially supported by the hoops 122 and guide posts 122. The cover 22 may widen from the forward portion of the cover 22 to a middle portion of the cover 22 that covers the hoops 123. The cover 22 may also widen from the rearward portion of the cover 22 to the middle portion of the cover 22 that covers the hoops 123. The cover 22 is sized to fit around the hoops 123 so as to protect and cover a wide variety of boats without requiring custom fitting. Although two hoops 123 are illustrated in FIG. 16, the cover system may instead have only a single hoop 123. Alternatively, more than two hoops 123 may be used to accommodate boats having a longer length or special needs.

The above described elements may be identified in the drawings as follows:
    10 Cover system
    20 Forward cover line
    22 Cover
    23 Cover track
    24 Roller tube
    25 Anti-racking bar (not in text)
    26 Swing arm
    27 Arm stiffener (not in text)
    28 Bow sprit
    30 Side rail
    32 Boat lift
    34 Swing Arm Hydraulic Cylinder
    36 Seabed
    38 Aft cover elastic
    40 Perimeter cord
    41 Lower section of swing arm
    44 Forward wing attachment (Port)
    45 Forward wing attachment (Stbd)
    46 Boat Lift transverse beam
    47 Forward Lift Legs
    48 Boat Lift bunks
    49 Aft Lift Legs
    50 Boat
    52 interior handles
    54 spreader bar
    60 Upper cylinder pivot
    61 Swing arm pivot
    62 Lower cylinder pivot
    64 Forward cover wing (Port)
    65 Forward cover wing (Stbd)
    66 Hydraulic Powerpack 68 Hydraulic power unit
70 Control box (RC)
72 Hydraulic switching manifold
74 Hydraulic hoses for lift
76 Hydraulic hoses for cover system
78 Battery
79 Torsion spring
80 Friction clutch
81 Clutch spring
82 Cylinder shaft
83 End fitting, cylinder shaft
84 Length Adjuster
85 Clip-on shims
86 Ratchet Plate
87 Centering puck
88 Locking pawl
89 Roller guide
90 End plate
91 Axle
92 Pin
93 Bolt
94 Spring mount (clutch side)
95 Spring mount (roller tube side)
96 Double nut
97 Spring sock
101 Actuation member
102 Translating part of boat lift
110 Limit switch
120 Guide track
121 Guide track support structure
122 Boat Lift cradle structure
123 Guide on
124 Hoop
125 Lifting cable
126 Actuation cable
127 Piling
128 winch
129 Pulley
130 Actuation cable end on translating part of lift
131 Actuation cable end on swing arm From the foregoing it will be appreciated that, although specific embodiments of the invention have been described herein for purposes of illustration, various modifications may be made without deviating from the spirit and scope of the invention.

Accordingly, the invention is not limited except as by the appended claims.

What is claimed is:

1. A watercraft covering apparatus for selectively covering a watercraft, comprising:
   at least one pivot arm having a lower end portion and an upper end portion, the pivot arm being pivotable between a first position wherein the upper end portion of the pivot arm is positioned proximate to a first end of the watercraft when the watercraft and a second position wherein the upper end portion of the pivot arm is positioned proximate to a second end of the watercraft;
   at least one actuation member having an actuation member lower end and an actuation member upper end pivotably attachable to the pivot arm at an attachment position between the lower end portion and the upper end portion, the actuation member being configured to selectively and pivotally move the pivot arm between the first position and the second position by adjusting a length of the actuation member;
   a roller rotatably supported by the upper end portion of the pivot arm for travel with the upper end portion of the pivot arm as the pivot arm is pivotally moved between the first position and the second position; and
   a watercraft cover substantially fully wound about the roller when the upper end portion of the pivot arm is in the first position, the cover being sized to lengthwise extend over and cover the watercraft when the pivot arm is moved to the second position,
   a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the pivot arm is moved from the first position to the second position the cover progressively mostly unwinds from the roller and is placed in position extending lengthwise covering the watercraft, and the unwinding of the cover from the roller applies a rotational force to the roller in the first rotational direction to tighten and generate a spring force in the torsion spring and tensions the cover, and as the pivot arm is moved from the second position to the first position the torsion spring applies the spring force to the roller to rotate the roller in the second rotational direction to progressively mostly wind the cover about the roller and remove the cover from covering the watercraft;
   wherein the at least one actuation member has a first elongated portion and a second elongated portion, the second elongated portion having an actuation member length adjustment portion that is lengthwise extendable relative to the first elongated portion and securable in a selected lengthwise position relative to the first elongated portion, and
   wherein the first position of the pivot arm is adjusted according to the selected lengthwise position of the actuation member length adjustment portion.

2. The watercraft covering apparatus of claim 1, the actuation member length adjustment portion is lengthwise extendable by twisting the actuation member length adjustment portion relative to the actuation member using screw threads.

3. A watercraft covering apparatus for selectively covering a watercraft, comprising:
   at least one pivot arm having a lower end portion and an upper end portion, the pivot arm being pivotable between a first position wherein the upper end portion of the pivot arm is positioned proximate to a first end of the watercraft and a second position wherein the upper end portion of the pivot arm is positioned proximate to a second end of the watercraft;
   at least one actuation member having an actuation member lower end and an actuation member upper end pivotably attached to the pivot arm at an attachment position between the lower end portion and the upper end portion, the actuation member being configured to selectively and pivotally move the pivot arm between the first position and the second position by adjusting a length of the actuation member, the at least one actuation member including an engaging portion;
   a mechanical stop disposed on the at least one actuation member, the mechanical stop being configured to prevent the upper end portion of the at least one actuation member from moving toward the actuation member lower end portion when the mechanical stop engages with the engaging portion;

a roller rotatably supported by the upper end portion of the pivot arm for travel with the upper end portion of the pivot arm as the pivot arm is pivotally moved between the first position and the second position;

a watercraft cover substantially fully wound about the roller when the upper end portion of the pivot arm is in the first position, the cover being sized to lengthwise extend over and cover the watercraft when the pivot arm is moved to the second position; and a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the pivot arm is moved from the first position to the second position the cover progressively mostly unwinds from the roller and is placed in position extending lengthwise covering the watercraft, and the unwinding of the cover from the roller applies a rotational force to the roller in the first rotational direction to tighten and generate a spring force in the torsion spring and tensions the cover, and as the pivot arm is moved from the second position to the first position the torsion spring applies the spring force to the roller to rotate the roller in the second rotational direction to progressively mostly wind the cover about the roller and remove the cover from covering the watercraft, wherein the at least one actuation member has a first length when the at least one actuation member is in the first position and the at least one actuation member has a second length when the pivot arm is in the second position, wherein the second position of the pivot arm is adjusted according to a position of the mechanical stop on the at least one actuation member.

4. The watercraft lift apparatus of claim 3, wherein the mechanical stop includes a plurality of selectively removable shims.

5. The watercraft lift apparatus of claim 3, the at least one pivot arm including a length adjustment portion, wherein adjusting a length of the length adjustment portion changes a length of the at least one pivot arm.

6. The watercraft lift apparatus of claim 5, further comprising:

a slip clutch which is operatively connected to the torsion spring to limit the rotational force the roller applies to the torsion spring as the pivot arm is moved from the first position to the second position.

7. A watercraft covering apparatus for selectively covering a watercraft, comprising:

at least one pivot arm having a lower end portion and an upper end portion, the at least one pivot arm being pivotable between a first position wherein the upper end portion of the pivot arm is positioned proximate to a first end of the watercraft and a second position wherein the upper end portion of the pivot arm is positioned proximate to a second end of the watercraft;

at least one actuation member having an actuation member lower end and an actuation member upper end pivotably attachable to the pivot arm at an attachment position between the lower end portion and the upper end portion, the actuation member being configured to selectively and pivotally move the pivot arm between the first position and the second position by adjusting a length of the actuation member;

a mechanical stop disposed on the at least one actuation member, the mechanical stop configured to limit the movement of the upper end portion of the at least one actuation member toward the actuation member lower end portion;

a roller rotatably supported by the upper end portion of the pivot arm for travel with the upper end portion of the pivot arm as the pivot arm is pivotally moved between the first position and the second position;

a watercraft cover substantially fully wound about the roller when the upper end portion of the pivot arm is in the first position, the cover being sized to lengthwise extend over and cover the watercraft when the pivot arm is moved to the second position; and a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the pivot arm is moved from the first position to the second position the cover progressively mostly unwinds from the roller and is placed in position extending lengthwise covering the watercraft, and the unwinding of the cover from the roller applies a rotational force to the roller in the first rotational direction to tighten and generate a spring force in the torsion spring and tensions the cover, and as the pivot arm is moved from the second position to the first position the torsion spring applies the spring force to the roller to rotate the roller in the second rotational direction to progressively mostly wind the cover about the roller and remove the cover from covering the watercraft;

wherein the at least one actuation member has a first length when the at least one actuation member is in the first position and the at least one actuation member has a second length when the pivot arm is in the second position, wherein the second length is adjusted according to a position of the mechanical stop on the at least one actuation member.

8. An automatic covering system for covering a target object, comprising:

a cover being substantially sized to lengthwise extend over and cover the target object;

a roller configured to rotatably wind the cover around the roller;

a deploying member movable between a first position wherein the cover is substantially wound about the roller and a second position wherein the cover substantially fully extends over the target object, the roller being rotatably supported by the deploying member for travel with the deploying member as the deploying member is moved between the first position and the second position;

a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the deploying member is moved from the first position to the second position the cover progressively mostly unwinds from the roller and is placed in position extending lengthwise covering the target object, and the unwinding of the cover from the roller applies a rotational force to the roller in the first rotational direction to tighten and generate a spring force in the torsion spring and tensions the cover, and as the deploying member is moved from the second position to the first position the torsion spring applies the spring force to the roller to rotate the roller in the second rotational direction to progressively mostly wind the cover about the roller and remove the cover from covering the target object; and a slip clutch which is operatively connected to the torsion spring to limit the rotational force the roller applies to the torsion spring as the deploying member is moved from the first position to the second position.

9. The automatic covering system of claim 8, wherein the automatic covering system is a covering attachment mechanism mounted to a watercraft lift.

10. The automatic covering system of claim 8, wherein the automatic covering system is a covering attachment mechanism mounted to an open-boxed bed of a wheeled vehicle.

11. The automatic covering system of claim 9, wherein the deploying member is a pivot arm that is pivotably attachable to a portion of the watercraft lift.

12. An automatic watercraft covering system for covering a watercraft, comprising:

a watercraft lift apparatus operable to lift and lower the watercraft;

a watercraft covering apparatus comprising:
at least one pivot arm having a lower end portion and an upper end portion, the at least one pivot arm being pivotable between a first position wherein the upper end portion of the pivot arm is positioned proximate to a first end of the watercraft when the watercraft is supported by the watercraft lift apparatus and a second position wherein the upper end portion of the pivot arm is positioned proximate to a second end of the watercraft when the watercraft is supported by the watercraft lift apparatus;

a roller rotatably supported by the upper end portion of the pivot arm for travel with the upper end portion of the pivot arm as the pivot arm is pivotally moved between the first position and the second position; and a watercraft cover substantially fully wound about the roller when the upper end portion of the pivot arm is in the first position, the cover being sized to lengthwise extend over and cover the watercraft when the pivot arm is moved to the second position and the watercraft is supported by the watercraft lift apparatus;

at least one limit switch configured to detect whether the pivot arm is in a predetermined position; and a controller configured to control (i) the watercraft lift apparatus to lift and lower the watercraft when supported by the watercraft lift apparatus, and (ii) the watercraft covering apparatus to move the at least one pivot arm between the first position and the second position, wherein the controller is configured to prevent the watercraft lifting apparatus from lifting or lowering the watercraft responsive to an indication from the at least one limit switch that the pivot arm is not in the predetermined position.

13. The automatic watercraft covering system of claim 12, further including:

at least one non-hydraulic actuation member having a first end attached to the pivot arm, the actuation member being configured to selectively move the pivot arm between the first position and the second position, wherein the actuation member is configured to move the pivot arm from the first position to the second position when the watercraft lift apparatus raises the watercraft, and the actuation member is configured to move the pivot arm from the second position to the first position when the watercraft lift apparatus lowers the watercraft.

14. An automatic watercraft covering system for use with a watercraft lift apparatus operable to lift and lower a watercraft, comprising:

at least one pivot arm having a lower end portion and an upper end portion, the pivot arm being pivotable between a first position wherein the upper end portion of the pivot arm is positioned proximate to a first end of the watercraft when the watercraft is supported by the watercraft lift apparatus and a second position wherein the upper end portion of the pivot arm is positioned proximate to a second end of the watercraft when the watercraft is supported by the watercraft lift apparatus;

at least one non-hydraulic actuation member having a first end attached to the pivot arm, the actuation member being configured to selectively move the pivot arm between the first position and the second position;

a roller rotatably supported by the upper end portion of the pivot arm for travel with the upper end portion of the pivot arm as the pivot arm is pivotally moved between the first position and the second position; and a watercraft cover substantially fully wound about the roller when the upper end portion of the pivot arm is in the first position, the cover being sized to lengthwise extend over and cover the watercraft when the pivot arm is moved to the second position and the watercraft is supported by the watercraft lift apparatus, wherein the actuation member is configured to move the pivot arm from the first position to the second position when the watercraft lift apparatus raises the watercraft, and the actuation member is configured to move the pivot arm from the second position to the first position when the watercraft lift apparatus lowers the watercraft, and wherein the non-hydraulic actuation member is a flexible member, and wherein a second end of the actuation member is attached to a fixed point.

15. The automatic watercraft covering system of claim 14, further comprising:

an arcuate cam member having a guide track along an outer arcuate surface, the guide track being configured to accommodate a length of the attachment member therein, and the cam member being attached to the at least one pivot arm and configured to rotate about the attachment position in concert with the pivot arm.

16. The automatic watercraft covering system of claim 15, wherein the automatic watercraft covering system is mounted on a four post cable watercraft lifting apparatus.

17. An automatic watercraft covering system, comprising:

a watercraft lift apparatus operable to raise and lower a watercraft, the watercraft lift apparatus including a four bar linkage structure;

at least one pivot arm having a lower end portion and an upper end portion, the pivot arm being pivotable between a first position wherein the upper end portion of the pivot arm is positioned proximate to a first end of the watercraft when the watercraft is supported by the watercraft lift apparatus and a second position wherein the upper end portion of the pivot arm is positioned proximate to a second end of the watercraft when the watercraft is supported by the watercraft lift apparatus;

at least one flexible actuation member having a first end attached to the pivot arm and a second end attached to a moving portion of the watercraft lift apparatus, the actuation member being configured to selectively move the pivot arm between the first position and the second position;

a roller rotatably supported by the upper end portion of the pivot arm for travel with the upper end portion of the pivot arm as the pivot arm is pivotally moved between the first position and the second position; and a watercraft cover substantially fully wound about the roller when the upper end portion of the pivot arm is in the first position, the cover being sized to lengthwise extend over and cover the watercraft when the pivot arm is moved to the second position and the watercraft is supported by the watercraft lift apparatus, wherein the actuation member is configured to move the pivot arm from the first position to the second position when the watercraft lift apparatus raises the watercraft, and the actuation member is configured to move the pivot arm from the second position to the first position when the watercraft lift apparatus lowers the watercraft.

18. An automatic watercraft covering system for use with a watercraft lift apparatus operable to lift and lower a watercraft, comprising:

at least one pivot arm having a lower end portion and an upper end portion, the at least one pivot arm being pivotable between a first position wherein the upper end portion of the pivot arm is positioned proximate to a first end of the watercraft and a second position wherein the upper end portion of the pivot arm is positioned proximate to a second end of the watercraft;

at least one non-hydraulic actuation member having a first end attached to the pivot arm, the actuation member being configured to selectively move the pivot arm between the first position and the second position;

a roller rotatably supported by the upper end portion of the pivot arm for travel with the upper end portion of the pivot arm as the pivot arm is pivotally moved between the first position and the second position;

a cover substantially fully wound about the roller when the upper end portion of the pivot arm is in the first position, the cover being sized to lengthwise extend over and cover the watercraft when the pivot arm is moved to the second position;

a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the pivot arm is moved by the actuation member from the first position to the second position the cover progressively mostly unwinds from the roller and is placed in position extending lengthwise covering the watercraft, and the unwinding of the cover from the roller applies a rotational force to the roller in the first rotational direction to tighten and generate a spring force in the torsion spring and tensions the cover, and as the pivot arm is moved by the actuation member from the second position to the first position the torsion spring applies the spring force to the roller to rotate the roller in the second rotational direction to progressively mostly wind the cover about the roller and remove the cover from covering the watercraft; and a slip clutch which is operatively connected to the torsion spring to limit the rotational force the roller applies to the torsion spring as the pivot arm is moved by the actuation member is moved from the first position to the second position, wherein the actuation member is configured to move the pivot arm from the first position to the second position when the watercraft lift apparatus raises the watercraft, and the actuation member is configured to move the at least one pivot arm from the second position to the first position when the watercraft lift apparatus lowers the watercraft.

19. The automatic watercraft covering system of claim 18, wherein the non-hydraulic actuation member is a flexible member, and wherein a second end of the actuation member is attached to a fixed point.

20. An automatic watercraft covering apparatus for use with a frame that accommodates a watercraft having a bow and a stern, comprising:

at least one pivot arm having a lower end portion and an upper end portion, the pivot arm being pivotable between a first position wherein the upper end portion of the pivot arm is positioned proximate to a first end of the watercraft and a second position wherein the upper end portion of the pivot arm is positioned proximate to a second end of the watercraft;

at least one actuation member having an actuation member lower end and an actuation member upper end pivotably attachable to the pivot arm;

a roller rotatably supported by the upper end portion of the pivot arm for travel with the upper end portion of the pivot arm as the pivot arm is pivotally moved between the first position and the second position, the roller having a first roller position when the pivot arm is in the first position and a second roller position when the pivot arm is in the second position;

at least one spacing member disposed between the first roller position and the second roller position, the spacing member being mountable on an upper portion of a watercraft guide post that extends vertically from water on a port side or a starboard side of the frame; and a watercraft cover substantially fully wound about the roller when the pivot arm is in the first position, the cover being sized to lengthwise extend over and cover the watercraft when the pivot arm is moved to the second position, wherein the roller travels above the spacing member when the pivot arm is moved between the first position and the second position, and the spacing member is configured to support the cover at a distance above the watercraft.

21. An automatic covering system for covering a target object, comprising:

a cover being substantially sized to lengthwise extend over and cover the target object;

a roller configured to rotatably wind the cover around the roller;

a deploying member movable between a first position wherein the cover is substantially wound about the roller and a second position wherein the cover substantially fully extends over the target object, the roller being rotatably supported by the deploying member for travel with the deploying member as the deploying member is moved between the first position and the second position;

a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the deploying member is moved from the first position to the second position the cover progressively mostly unwinds from the roller and is placed in position extending lengthwise covering the target object, and the unwinding of the cover from the roller applies a rotational force to the roller in the first rotational direction to tighten and generate a spring force in the torsion spring and tension the cover, and as the deploying member is moved from the second position to the first position the torsion spring applies the spring force to the roller to rotate the roller in the second rotational direction to progressively mostly wind the cover about the roller and remove the cover from covering the target object; and a non-metallic tube positioned between the torsion spring and an interior surface of the roller.

22. An automatic watercraft covering system for use with a watercraft lift having a watercraft lifting member operable between a raised position and a lowered position to raise and lower a watercraft supported by the watercraft lifting member, comprising:

at least one pivot arm having a lower end portion and an upper end portion, the lower end portion being pivotably attachable to the watercraft lifting member, the pivot arm being pivotable between a first position wherein the upper end portion of the pivot arm is positioned proximate to a first end of the watercraft when the watercraft is supported by the watercraft lifting member and a second position wherein the upper end portion of the pivot arm is positioned proximate to a second end of the watercraft when the watercraft is supported by the watercraft lifting member;

at least one actuation member having a first end attached to the pivot arm, the actuation member being operable to selectively move the pivot arm between the first position and the second position;

a roller rotatably supported by the upper end portion of the pivot arm to travel with the upper end portion of the pivot arm as the pivot arm is pivotally moved between the first position and the second position; and a watercraft cover substantially fully wound about the roller when the upper end portion of the pivot arm is in the first position, the cover being sized to lengthwise extend over and cover the watercraft when the pivot arm is moved to the second position and the watercraft is supported by the watercraft lifting member, wherein the actuation member is configured to move the pivot arm from the first position to the second position when the watercraft lifting member raises the watercraft, and the actuation member is configured to move the at least one pivot arm from the second position to the first position when the watercraft lifting member lowers the watercraft.

23. An automatic covering system for covering a target object, comprising:

a cover being substantially sized to lengthwise extend over and cover the target object;

a roller configured to rotatably wind the cover around the roller, the roller being movable between a first position wherein the cover is substantially wound about the roller and a second position wherein the cover substantially fully extends over the target object;

a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the deploying member is moved from the first position to the second position the cover progressively mostly unwinds from the roller and is placed in position extending lengthwise covering the target object, and the unwinding of the cover from the roller applies a rotational force to the roller in the first rotational direction to tighten and generate a spring force in the torsion spring and tensions the cover, and as the deploying member is moved from the second position to the first position the torsion spring applies the spring force to the roller to rotate the roller in the second rotational direction to progressively mostly wind the cover about the roller and remove the cover from covering the target object; and a slip clutch which is operatively connected to the torsion spring to limit the rotational force the roller applies to the torsion spring as the deploying member is moved from the first position to the second position.

24. The automatic covering system of claim 23, further including a deploying member attached to the roller, the deploying member being configured to move the roller between the first position and the second position, the roller being rotatably supported by the deploying member for travel with the deploying member as the deploying member transitions the roller between the first position and the second position.

25. The covering system of claim 23 for use with a watercraft lift and the target object is a watercraft, wherein the cover is mountable to the watercraft lift in position to extend over and cover the watercraft when the roller is in the second position.

26. An automatic covering system for covering a target object, comprising:

a cover being substantially sized to lengthwise extend over and cover the target object;

a roller configured to rotatably wind the cover around the roller;

at least one pivot arm movable between a first position wherein the cover is substantially wound about the roller and a second position wherein the cover substantially fully extends over the target object, the roller being rotatably supported by the pivot arm for travel with the pivot arm as the pivot arm is moved between the first position and the second position;

a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the pivot arm is moved from the first position to the second position the cover progressively mostly unwinds from the roller and is placed in position extending lengthwise covering the target object, and the unwinding of the cover from the roller applies a rotational force to the roller in the first rotational direction to tighten and generate a spring force in the torsion spring and tensions the cover, and as the pivot arm is moved from the second position to the first position the torsion spring applies the spring force to the roller to rotate the roller in the second rotational direction to progressively mostly wind the cover about the roller and remove the cover from covering the target object; and a member adjustable to adjustably select a location of at least one of the first and second positions of the pivot arm by limiting the movement of the pivot arm.

27. The automatic covering system of claim 26, wherein the automatic covering system is a covering attachment mechanism mounted to a watercraft lift.

28. An automatic covering system for covering a target object, comprising:

a lift member for lifting and lowering the target object when positioned thereon, the lifting member being movable between a lowered position and a raised position;

a cover being substantially sized to lengthwise extend over and cover the target object;

a roller configured to rotatably wind the cover around the roller;

a deploying member movable between a first position wherein the cover is substantially wound about the roller and a second position wherein the cover substantially fully extends over the target object, the roller being rotatably supported by the deploying member for travel with the deploying member as the deploying member is moved between the first position and the second position;

a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the deploying member is moved from the first position to the second position the cover progressively mostly unwinds from the roller and is placed in position extending lengthwise covering the target object, and the unwinding of the cover from the roller applies a rotational force to the roller in the first rotational direction to tighten and generate a spring force in the torsion spring and tensions the cover, and as the deploying member is moved from the second position to the first position the torsion spring applies the spring force to the roller to rotate the roller in the second rotational direction to progressively mostly wind the cover about the roller and remove the cover from covering the target object; and a controller selectively operable to operate the lifting member and the deploying member, the controller controlling movement of the lifting member between the lowered position and the raised position, and controlling movement of the deploying member between the first position and the second position, the controller inhibiting movement of the deploying member unless the lifting member is in the raised position.

29. The automatic covering system of claim 28, wherein controller inhibits movement of the lifting member from the raised position to the lowered position unless the deploying member is in the first position.

30. The automatic covering system of claim 28, wherein the controller uses a single hydraulic pump to alternatively supply hydraulic power to the lifting member for lifting and lowering the target object and to the deploying member for moving the deploying member between the first and second positions, the controller automatically switching the hydraulic pump from supplying hydraulic power to the lifting member to supplying hydraulic power to the deploying member when the lifting member is moved to the raised position.

31. The automatic covering system of claim 30, wherein the controller automatically switching the hydraulic pump from supplying hydraulic power to the deploying member to supplying hydraulic power to the lifting member when the deploying member is moved to the first position.

32. The automatic covering system of claim 31, wherein the controller includes a user operable switch which controls the operation of both the lifting member and the deploying member.

33. The automatic covering system of claim 28, wherein the controller uses a single hydraulic pump to alternatively supply hydraulic power to the lifting member for lifting and lowering the target object and to the deploying member for moving the deploying member between the first and second positions, and when the lifting member is moved to the raised position, the controller automatically switches the hydraulic pump from supplying hydraulic power to the lifting member to supplying hydraulic power to the deploying member to permit moving the deploying member from the second position to the first position to uncover the target object, and when the deploying member is moved to the first position, the controller automatically switches the hydraulic pump from supplying hydraulic power to the deploying member to supplying hydraulic power to the lifting member to permit moving the lifting member to the lowered position with the target object remaining uncovered.

34. An automatic covering system for covering a target object, comprising:

a cover being substantially sized to lengthwise extend over and cover the target object, the cover having an interior side positioned facing toward the target object when covering the target object, the interior side having a plurality of handles graspable by a user in positioning the cover over the target object;

a roller configured to rotatably wind the cover around the roller;

a deploying member movable between a first position wherein the cover is substantially wound about the roller and a second position wherein the cover substantially fully extends over the target object, the roller being rotatably supported by the deploying member for travel with the deploying member as the deploying member is moved between the first position and the second position; and a torsion spring positioned within the roller and operatively connected to the roller so that as the roller is rotated in a first rotational direction the torsion spring is wound tighter by the rotation of the roller and as the torsion spring is permitted to unwind the roller is rotated by the torsion spring in a second rotational direction opposite the first rotational direction, as the deploying member is moved from the first position to the second position the cover progressively mostly unwinds from the roller and is placed in position extending lengthwise covering the target object, and the unwinding of the cover from the roller applies a rotational force to the roller in the first rotational direction to tighten and generate a spring force in the torsion spring and tensions the cover, and as the deploying member is moved from the second position to the first position the torsion spring applies the spring force to the roller to rotate the roller in the second rotational direction to progressively mostly wind the cover about the roller and remove the cover from covering the target object.

35. The automatic covering system of claim 34 for use with a target object, wherein the cover is elongated with a first end positionable toward a first end to the target object and a second end positionable toward a second end of the target object when the cover extends over and covers the target object, the plurality of handles being spaced apart along a longitudinal length of the cover.

36. An automatic covering system for covering a target object, comprising:
  a cover being substantially sized to lengthwise extend over and cover the target object, the cover having an interior side positioned facing toward the target object when covering the target object, the interior side having a plurality of handles graspable by a user in positioning the cover over the target object;
  a roller configured to rotatably wind the cover around the roller;
  a deploying member movable between a first position wherein the cover is substantially wound about the roller and a second position wherein the cover substantially fully extends over the target object, the roller being rotatably supported by the deploying member for travel with the deploying member as the deploying member is moved between the first position and the second position; and
  a torsion spring positioned within the roller and operatively connected to the roller so that as the deploying member is moved from the first position to the second position the cover progressively mostly unwinds from the roller and is placed in position extending lengthwise covering the target object, and as the deploying member is moved from the second position to the first position the cover progressively mostly winds about the roller and removes the cover from covering the target object.

* * * * *